US010445326B2

(12) United States Patent
Glover

(10) Patent No.: US 10,445,326 B2
(45) Date of Patent: Oct. 15, 2019

(54) SEARCHING BASED ON APPLICATION USAGE

(71) Applicant: Samsung Electronics Co., Ltd., Suwon-si, Gyeonggi-do (KR)

(72) Inventor: Eric Glover, Palo Alto, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 639 days.

(21) Appl. No.: 14/985,605

(22) Filed: Dec. 31, 2015

(65) Prior Publication Data

US 2017/0193053 A1 Jul. 6, 2017

(51) Int. Cl.
G06F 16/2457 (2019.01)

(52) U.S. Cl.
CPC .. *G06F 16/24578* (2019.01); *G06F 16/24575* (2019.01)

(58) Field of Classification Search
CPC .......... G06F 17/3053; G06F 17/30528; G06F 16/24578; G06F 16/24575
See application file for complete search history.

(56) References Cited

U.S. PATENT DOCUMENTS

| 8,359,309 | B1* | 1/2013 | Provine | G06F 17/30646 |
| | | | | 707/721 |
| 2007/0067297 | A1* | 3/2007 | Kublickis | G06Q 30/02 |
| 2009/0210631 | A1* | 8/2009 | Bosworth | G06F 12/0875 |
| | | | | 711/141 |
| 2012/0078906 | A1* | 3/2012 | Anand | G06F 17/30702 |
| | | | | 707/737 |
| 2014/0006129 | A1* | 1/2014 | Heath | G06Q 30/0222 |
| | | | | 705/14.23 |
| 2014/0351233 | A1* | 11/2014 | Crupi | G06F 17/30516 |
| | | | | 707/706 |
| 2014/0359584 | A1* | 12/2014 | Chu | G06F 17/30592 |
| | | | | 717/131 |

(Continued)

OTHER PUBLICATIONS

"Learn How People Use Your App—An App Analytics Tools Round-Up" http://web.archive.org/web/20141022055936/http://www.apptamin.com/blog/app-analytics-tools/, Oct. 22, 2014.

(Continued)

*Primary Examiner* — Kris E Mackes
*Assistant Examiner* — Lin Lin M Htay
(74) *Attorney, Agent, or Firm* — Jefferson IP Law, LLP

(57) ABSTRACT

A method includes retrieving event analytics data for a software application installed on a plurality of user devices. The event analytics data indicates a number of times each of the application states of the software application were accessed by the user devices. The method further includes mapping function names to the application states accessed by the user devices, each of the function names indicating a functionality associated with the software application. The method further includes determining a usage fraction value for each of the function names, the usage fraction value for each function name indicating the number of times the function name was mapped relative to the number of times each of the function names was mapped. Additionally, the method includes receiving a search query, generating search results based on at least one of the usage fraction values, and transmitting search results.

20 Claims, 14 Drawing Sheets

(56) References Cited

U.S. PATENT DOCUMENTS

2014/0366044 A1* 12/2014 Neeman .................. G06F 9/542
719/318
2016/0261472 A1* 9/2016 Tubi ...................... H04L 43/065

OTHER PUBLICATIONS

"Flurry Analytics Feature Overview" http://www.flurry.com/sites/default/files/resources/Flurry%20Analytics%20Feature%20Overview.pdf, Jul. 7, 2013.

* cited by examiner

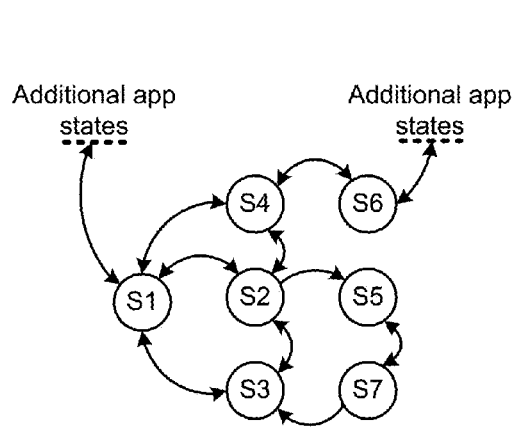
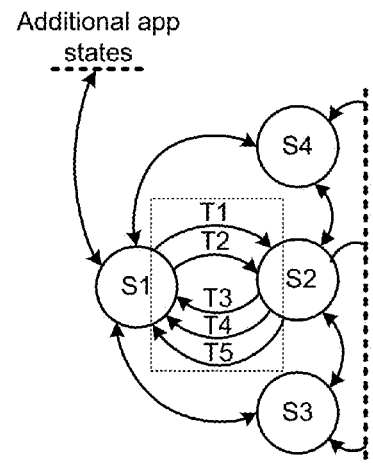
FIG. 4A
FIG. 4B
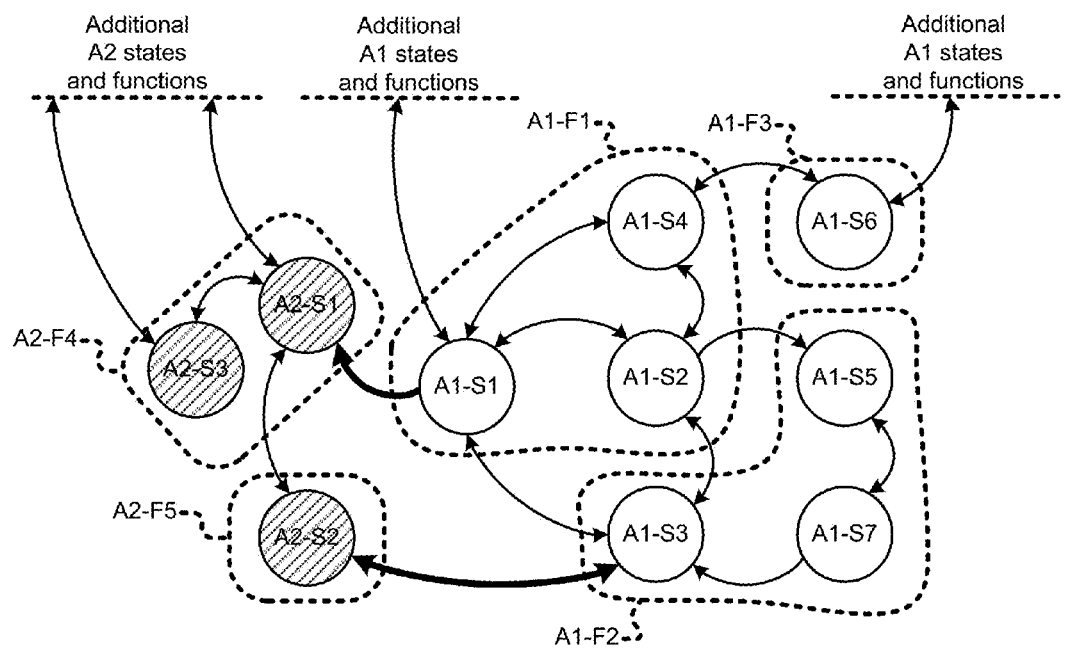
FIG. 4C

SEARCHING BASED ON APPLICATION USAGE

TECHNICAL FIELD

This disclosure relates to techniques for generating search results, and more particularly to generating search results based on application usage.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and much more. Furthermore, application developers develop vast amounts of applications within each genre and each application may have numerous editions. As a result, users of these Internet-connected devices have encountered the problem of finding the correct native or web software application offering the information and/or functionality that they seek.

SUMMARY

In one example, the present disclosure is directed to a method comprising retrieving event analytics data for a software application installed on a plurality of user devices. The software application includes a plurality of accessible application states that can be accessed by the user devices. The event analytics data indicates a number of times each of the accessible application states were accessed by the user devices. The method further comprises retrieving a list of function names for the software application and mapping instructions indicating how to map the function names to accessible application states of the software application. Each of the function names indicates a functionality associated with the software application and each of the function names maps to one or more of the accessible states of the software application. The method further comprises mapping function names to the application states accessed by the user devices and determining a number of times each of the function names was mapped to the application states accessed by the user devices. The method further comprises determining a usage fraction value for each of the function names based on the number of times each of the function names was mapped, the usage fraction value for each function name indicating the number of times the function name was mapped relative to the number of times each of the function names was mapped. Additionally, the method comprises receiving a search query from a querying user device, generating search results based on the received search query and at least one of the usage fraction values, and transmitting the search results to the querying user device.

In another example, the present disclosure is directed to a system of one or more computing devices configured to retrieve event analytics data for a software application installed on a plurality of user devices. The software application includes a plurality of accessible application states that can be accessed by the user devices. The event analytics data indicates a number of times each of the accessible application states were accessed by the user devices. The one or more computing devices are configured to retrieve a list of function names for the software application and mapping instructions indicating how to map the function names to accessible application states of the software application. Each of the function names indicates a functionality associated with the software application and each of the function names maps to one or more of the accessible states of the software application. The one or more computing devices are configured to map function names to the application states accessed by the user devices, determine a number of times each of the function names was mapped to the application states accessed by the user devices, and determine a usage fraction value for each of the function names based on the number of times each of the function names was mapped. The usage fraction value for each function name indicates the number of times the function name was mapped relative to the number of times each of the function names was mapped. Additionally, the one or more computing devices are configured to receive a search query from a querying user device, generate search results based on the received search query and at least one of the usage fraction values, and transmit the search results to the querying user device.

BRIEF DESCRIPTION OF DRAWINGS

The details of one or more examples are set forth in the accompanying drawings and the description below. Other features, objects, and advantages will be apparent from the description and drawings, and from the claims.

FIGS. 4A-4C illustrate example state graphs and function graphs.

DETAILED DESCRIPTION

Figure 1:
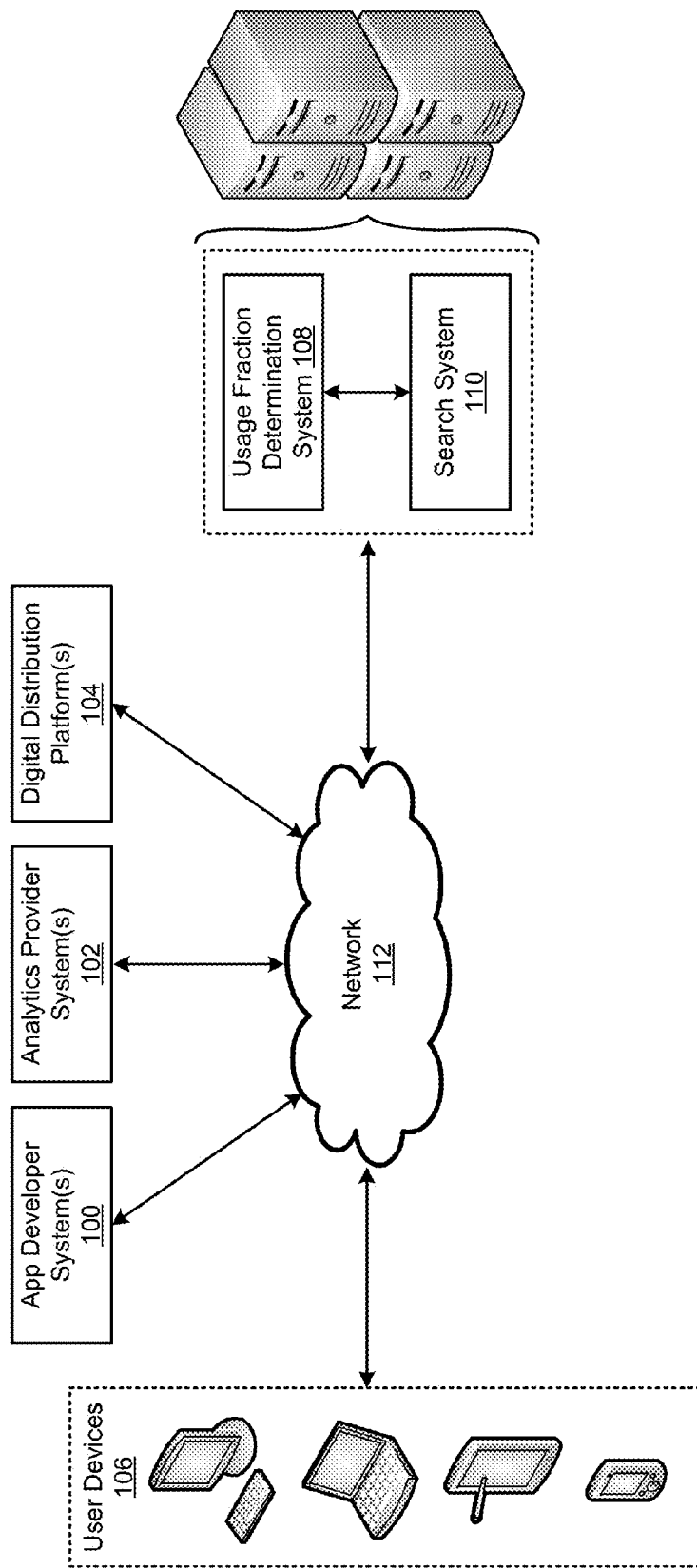
FIG. 1 illustrates an example environment including a usage fraction determination system and a search system of the present disclosure.

The figures and the following description relate to example implementations by way of illustration only. It should be noted that from the following discussion, alternative implementations of the structures and methods disclosed herein will be readily recognized as viable alternatives that may be employed without departing from the scope of the disclosure.

The present disclosure is directed to generating search results based on usage fraction values that indicate how users engage with a software application's different functionalities. Applications provide a variety of different functions for users. In the present disclosure, each application (e.g., native/web application) is associated with a set of functions (e.g., a set of function names). For example, a review application that provides reviews of businesses may have a plurality of functions, such as "Read Restaurant Review," "Read Store Review," "Provide Restaurant Info," "Show menu," and "Show food photos." As another example, a mapping and navigation application may have a plurality of functions, such as "Find transportation to location," "Driving Directions," "Walking Directions," and "Show nearby gas stations." Each function of an application can be associated with (e.g., assigned to) one or more states of the application. As described herein, each function name can be descriptive of the states with which the function is associated. For example, the review application described above may include a plurality of application states that show menu items for different restaurants. In this example, each of the application states that show menu items may be associated with the "Show menu" function.

A usage fraction determination system of the present disclosure determines the usage fraction values based on analytics data describing how users use the applications (e.g., which application states are accessed). A usage fraction value associated with a function may indicate the relative usage of the function among the plurality of other functions provided by the application. In some cases, usage fraction values for the same/similar functions from a plurality of different applications can be used to compare the functions across the plurality of different applications. For example, those functions that have higher usage fraction values and user engagement may be more relevant than those functions that have lower usage fraction values and/or less user engagement. Information yielded by the usage fraction values, along with other information, can be used in a variety of different ways. In some implementations, a search system of the present disclosure may leverage the usage fraction values to generate relevant search results.

Each function of an application can be assigned a usage fraction value indicating how much the function is used (e.g., across a group of users). For example, for a set of functions, each of the functions can be assigned a usage fraction value indicating the respective amount of usage for each function. In a more specific example, if an application has four functions, each of the four functions can be assigned a respective usage fraction value. The usage fraction values for an application may be percentage values that indicate an amount of usage of a single function relative to the other functions of the application. The usage fraction values may add up to 100 percent.

The usage fraction determination system may determine different types of usage fraction values for the same application. Example usage fraction types may include a time-based usage fraction type and an event-based usage fraction type. An application may have a plurality of usage fraction values for each type of usage fraction. For example, for a single usage fraction type, an application may have a single usage fraction value for each of the functions of the application. In a specific example, if an application has four functions and two usage fraction types, the application may have two sets of usage fraction values, one set of four usage fraction values for a first type of usage fraction and another set of four usage fraction values for a second type of usage fraction. In this example, each function of the application can be assigned two usage fraction values.

In some implementations, the usage fraction determination system may determine one or more user engagement values that indicate an amount of users (e.g., number of user devices) that engaged with the application (e.g., the popularity of the application). For example, a user engagement value may indicate the number of users for which analytics data was collected (e.g., the analytics data upon which the usage fraction values are based). Additionally, or alternatively, user engagement values may include, but are not limited to, a number of application downloads, a number of daily active users, and a number of monthly active users.

The search system may generate search results based on usage fraction values and user engagement values. For example, when generating a relevance score for an application state, the search system may use the user engagement value of the application and the usage fraction value associated with the function of the application state. In a specific example, the search system may generate a relevance score for an application state by using the product of the user engagement value and the usage fraction value associated with the application state. The combination (e.g., product) of the user engagement values and the usage fraction values may be more indicative of the overall user engagement with functionality of an application than either value is alone. Additionally, in some cases, the product of the values (referred to herein as a "normalized usage fraction value") may allow for a comparison of search results across different applications having different popularities. Specifically, since a normalized usage fraction value takes into account both usage fraction and user engagement, an unpopular first application with a high usage fraction value for a function may not necessarily be found as more relevant than a very popular second application with a relatively low usage fraction value, assuming the normalized usage fraction value is greater for the second application. Although the magnitude of the normalized usage fraction value may not be dispositive of relevance, it can be used as a signal that may provide improved search relevance.

FIG. 1 illustrates an example environment that includes one or more application developer systems 100, one or more analytics provider systems 102, and one or more digital distribution platforms 104. The application developer systems 100 represent computing systems of native application developers. The native application developers develop native applications that execute on user devices 106 and then provide the native applications for download on the digital distribution platforms 104. The digital distribution platforms 104 may represent computing systems that are configured to distribute native applications to user devices 106. Example digital distribution platforms 104 include, but are not limited to, the GOOGLE PLAY® digital distribution platform by Google, Inc. and the APP STORE® digital distribution platform by Apple, Inc.

The analytics provider systems 102 represent computing systems that may be operated by analytics software developers. The analytics software developers may develop analytics modules (e.g., application analytics modules 212-1 and/or device analytics modules 212-2 of FIG. 2) and provide the analytics modules for inclusion in native applications and in user devices 106. For example, the analytics software developers may provide the analytics modules for download on the analytics provider systems 102.

FIG. 1 includes a usage fraction determination system 108 (hereinafter "UF determination system 108") and a search system 110. The UF determination system 108 retrieves the analytics data from the application developers systems 100 and/or the analytics provider systems 102 and determines usage fraction values based on the retrieved analytics data. In some implementations, the UF determination system 108 may also determine user engagement values. The search system 110 receives search queries from user devices 106, generates search results based on the usage fraction values and the user engagement values, and transmits the search results to the user devices 106.

The user devices 106, application developer systems 100, analytics provider systems 102, digital distribution platforms 104, UF determination system 108, and search system 110 may communicate via a network 112. The network 112 may include various types of networks, such as a local area network (LAN), wide area network (WAN), and/or the Internet.

User devices 106 include, but are not limited to, smart phones, tablet computers, laptop computers, and desktop computers. User devices 106 may also include other computing devices having other form factors, such as computing devices included in vehicles, gaming devices, televisions, or other appliances (e.g., networked home automation devices and home appliances). The user devices 106 may use a variety of different operating systems (illustrated at 1112 in FIG. 11). In an example where a user device 106 is a mobile device, the user device 106 may run an operating system including, but not limited to, ANDROID® developed by Google Inc. or IOS® developed by Apple Inc. In an example where a user device 106 is a laptop or desktop computing device, the user device 106 may run an operating system including, but not limited to, MICROSOFT WINDOWS® by Microsoft Corporation, MAC OS® by Apple, Inc., or Linux.

Figure 11:
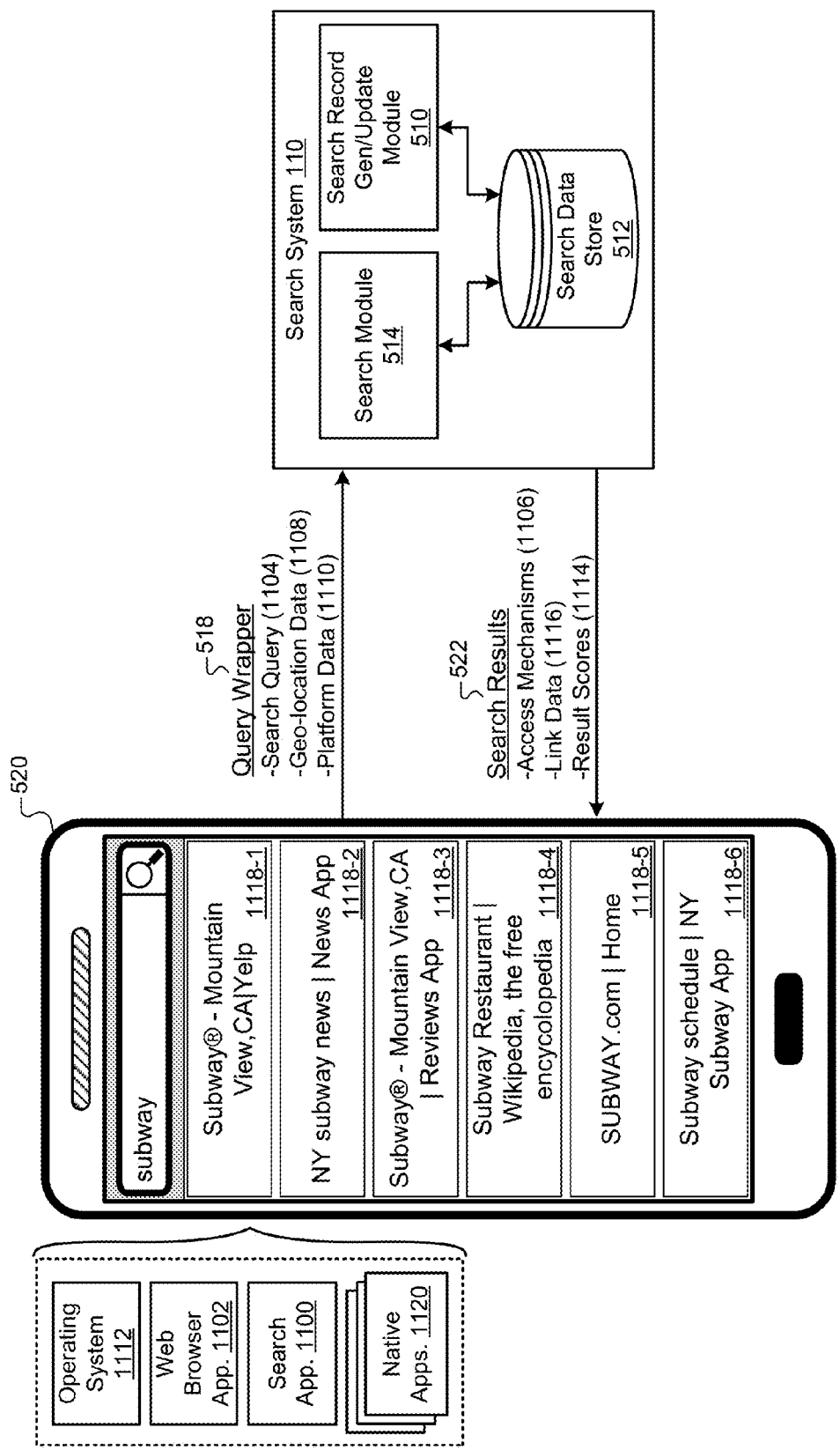
FIG. 11 illustrates an example user device in communication with a search system.

User devices 106 may have a plurality of installed native applications (illustrated at 1120 in FIG. 11). In some examples, native applications may function without communication with other remote computing devices (e.g., via the Internet). In other examples, a native application installed on a user device may access information from other remote computing devices during operation. For example, a weather application installed on a user device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser on the user device (e.g., a native installed web browser application illustrated at 1102 in FIG. 11). Example web applications may include, but are not limited to, web-based email, online auctions, and online retail sites.

Figure 2:
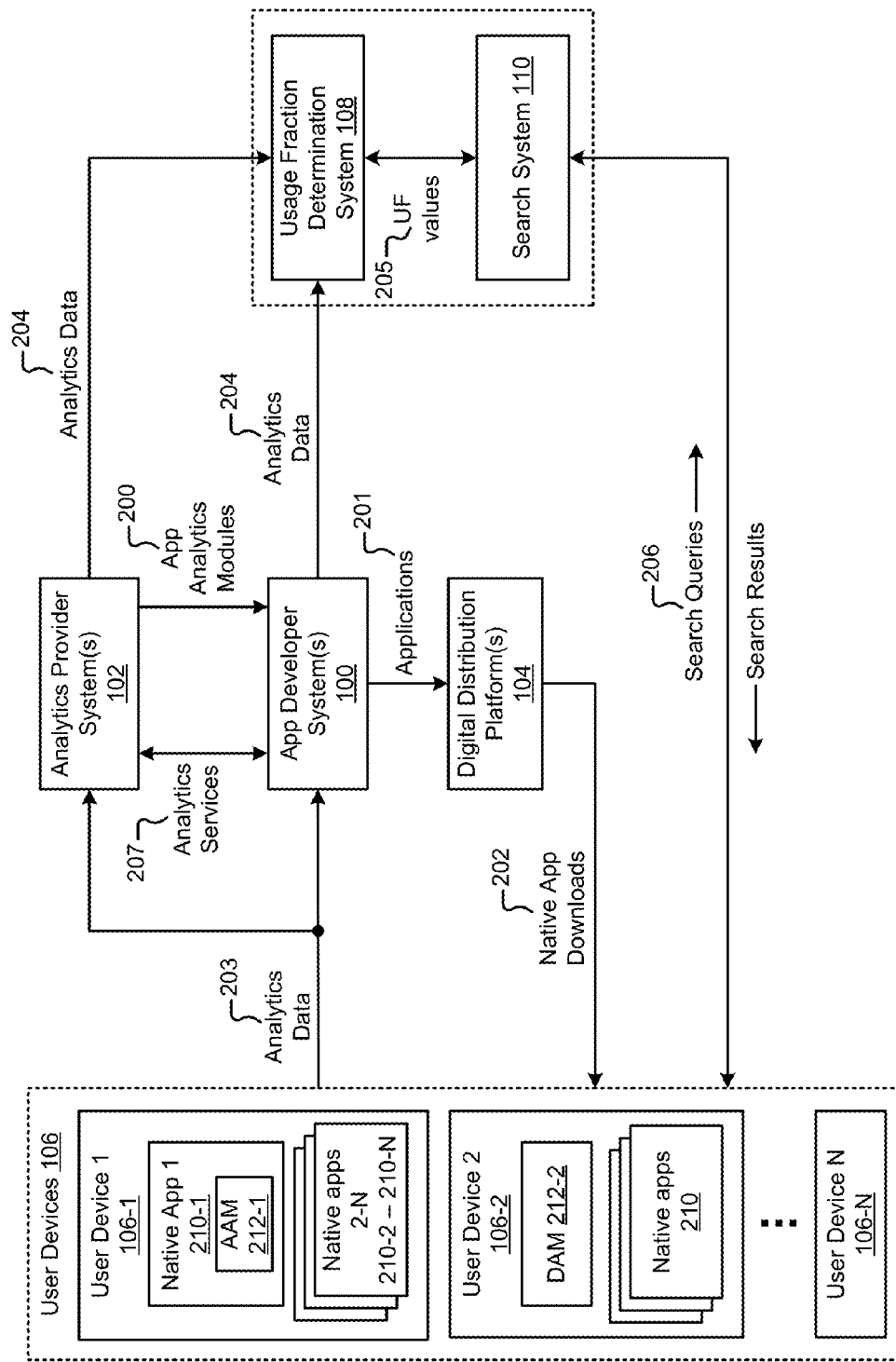
FIG. 2 is an example functional block diagram of the environment of FIG. 1.
Figure 3:
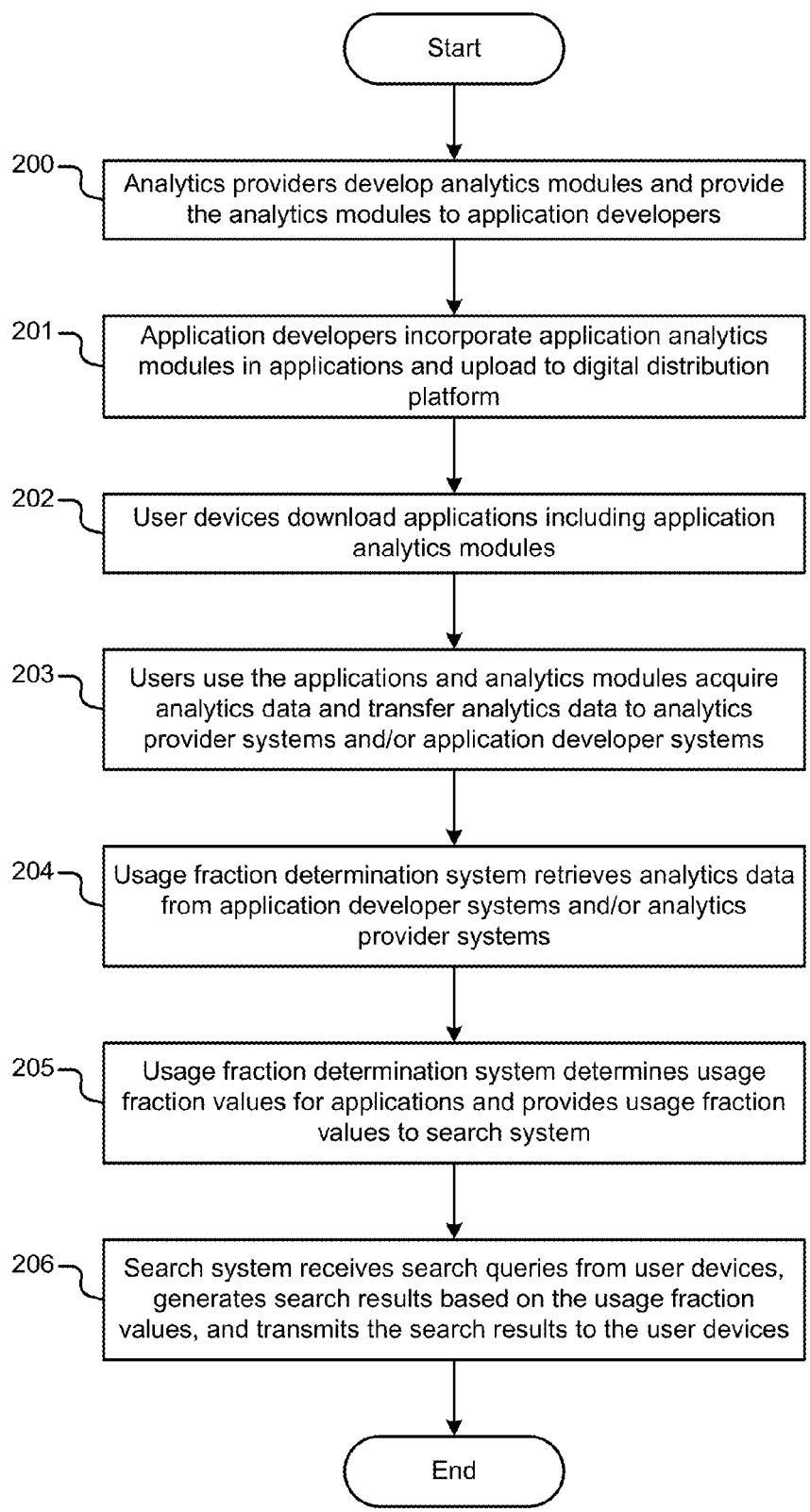
FIG. 3 is a flow diagram illustrating an example method describing the operation of the environment of FIG. 1.

FIG. 2 illustrates a functional block diagram including the systems of FIG. 1. FIG. 3 illustrates a method describing operation of the systems included in FIGS. 1-2. Example communication between the systems and user devices are labeled with callouts 200-206. The callouts 200-206 illustrate an example sequence of communications between the systems and user devices. The method of FIG. 3 also includes callouts 200-206 that correspond to the callouts of FIG. 2. Example operations performed by the systems are now described with respect to FIGS. 2-3.

Referring to FIG. 3, the analytics providers develop analytics modules 210 and provide the analytics modules 212 to the application developer systems 100 at 200. For example, the analytics providers may provide application analytics modules 212-1 (AAM 212-1 in FIG. 2) to the developers for download on the analytics provider systems 102. In this example, the application developer systems 100 may retrieve the application analytics modules 212-1 from the analytics provider systems 102 and include the application analytics modules 212-1 in the native applications 210 under development. Although the analytics developers may provide application analytics modules 212-1 to the application developers for insertion into native applications 210, in some implementations, analytics provider systems 102 can provide device analytics modules 212-2 (DAM 212-2 in FIG. 2) for inclusion on the one or more user devices 106 outside of native applications 210 provided on the digital distribution platforms 104.

At 201, the application developers incorporate the application analytics modules 212-1 into the native applications 210 and upload the native applications 210 to the digital distribution platforms 104. At 202, a plurality of user devices 106 download and install the native applications 210 including the application analytics modules 212-1. At 203, users use the native applications 210 on the user devices 106 and the application analytics modules 212-1 acquire analytics data (e.g., event analytics data) associated with usage of the applications. The application analytics modules 212-1 transfer the acquired analytics data to the respective analytics provider systems 102 and/or the respective application developer systems 100. In some cases, the application developer systems 100 can store the analytics data. In other cases, the analytics provider systems 102 may store the analytics data and allow the application developer systems 100 to access the analytics data, as indicated by the analytics services provided at 207. Example analytics services may include formatting analytics data, analyzing the analytics data, displaying analytics data (e.g., via a dashboard), and providing the analytics data to developers for download.

At 204, the UF determination system 108 retrieves the analytics data from the application developer systems 100 and/or the analytics provider systems 102, depending on which systems store the analytics data acquired by the user devices 106 (e.g., application analytics modules 212-1 and/or device analytics modules 212-2). At 205, the UF determination system 108 determines usage fraction values based on the retrieved analytics data and provides the usage fraction values to the search system 110. At 206, the search system 110 receives search queries from the user devices 106, generates search results based on the usage fraction values, and then transmits the search results to the user devices 106.

FIGS. 4A-4C illustrate example application state/function graphs including application states, application functions, and transitions between the application states and application functions. Application states, functions, and transitions are described hereinafter with respect to FIGS. 4A-4C.

An application state can refer to a page/screen within an application. In some cases, an application state can be reached as a result of user interaction with the user device on which the native application is installed (e.g., selection of a user selectable link). A user device can access an application state using an access mechanism. In some cases, an access mechanism may be a uniform resource locator (URL) that has been defined before search time and is retrieved during a search (e.g., by the search system 110). In other cases, the access mechanism may be completed at search time using contextual data, such as a user's geolocation. For example, an access mechanism can be completed with the user's current geolocation to render a state that is geo-relevant to the user at search time. In a more specific example related to completing an access mechanism at search time, the search system 110 may generate an access mechanism to a state of an application for reserving a taxi, where the state uses the user's current geo-location to display a map of where the user is relative to taxis at the present time.

Access mechanisms may include at least one of a native application access mechanism (hereinafter "application access mechanism"), a web access mechanism, and an application download mechanism. The user device 106 may use the access mechanisms to access functionality of applications. As described herein, the search system 110 may transmit one or more application access mechanisms, one or more web access mechanisms, and one or more application download mechanisms to the user device 106 in search results.

An application access mechanism may be a string that includes a reference to a native application (e.g., one of native applications 210 installed on the user devices 106) and indicates one or more operations for the user device 106 to perform. If a user selects a user selectable link including an application access mechanism, the user device 106 may launch the native application referenced in the application access mechanism and set the application into a state specified by the application access mechanism. In some cases the application access mechanisms can include application resource identifiers (e.g., defined by the application developers). Such application resource identifiers may have a format similar to a web URL schema including a domain and a path. For example, an application resource identifier for the OPENTABLE® application developed by OpenTable, Inc. may be "vnd.opentable.deeplink://opentable.com/restaurant/profile?rid=1180&refid=1." This specific application resource identifier may cause the OPENTABLE® Android native application to launch a restaurant table reservation page for a restaurant named "The French Laundry." In some cases, an application access mechanisms may include operations for the user device 106 to perform (e.g., a script) in addition to, or in place of, the application resource identifiers. Examples operations may include, but are not limited to, launching a native application, waiting for the native application to start, creating and sending a search request to a server, setting a current geo-location in a native application, making a restaurant reservation, sending a text message, and adding an appointment to a calendar.

A web access mechanism may include a resource identifier that includes a reference to a web resource (e.g., a page of a web application/website). For example, a web access mechanism may include a uniform resource locator (URL) (i.e., a web address) used with hypertext transfer protocol (HTTP). If a user selects a user selectable link including a web access mechanism, the user device 106 may launch the web browser application (e.g., illustrated at 1102 in FIG. 11) and retrieve the web resource indicated in the resource identifier. Put another way, if a user selects a user selectable link including a web access mechanism, the user device 106 may launch the web browser application and access a state (e.g., a page) of a web application/website. In some examples, web access mechanisms may include URLs for mobile-optimized sites and/or full sites.

An application download mechanism may indicate a site (e.g., one of digital distribution platforms 104) where a native application can be downloaded in the scenario where the native application is not installed on the user device 106.

If a user selects a user selectable link including an application download address, the user device 106 may access a digital distribution platform from which the referenced native application may be downloaded. The user device 106 may access a digital distribution platform using at least one of the web browser application and one of the native applications.

A user device 106 can access native application states in a variety of different ways from within the native application or from outside of the native application. In one example, a user can select a search result link (associated with an access mechanism) on a webpage or a search result link within a native search application that causes a native application to launch to an application home page or into another state of the native application. In another example, a user can select a web link (e.g., a web page hyperlink) that causes a native application to be set into an application state specified by the web link. In another example, a user can select a link within a native application that sets the native application to a different state within the same native application or accesses a state within a different native application. Although the user device 106 may launch application states in response to the selection of links, in other examples, other types of user interactions with other GUI elements (within our outside of the native application) may cause the user device to access application states. Example interactions may include user interaction with other GUI elements within/outside of the application, such as GUI buttons (e.g., an OK button, a back button, etc.), menus (e.g., drop down menus), or other navigational GUI elements.

A user can interact with the user device 106 to transition from one application state to another. For example, a user can transition from a first state of a first application to a second state of the first application via a user interaction with the first state (e.g., selection of a link in the first state or interaction with a GUI element of the first state). As another example, a user can transition from a state of a first application to a state of a second application via a user interaction with the state of the first application (e.g., via selection of a link in the state of the first application or interaction with a GUI element of the state). Since different states may include different pages/screens, at least a portion (or all) of the page/screen may change during a transition between states.

Application states may differ among different applications. For example, application states may display information retrieved from the internet (or the user device 106), provide interactive GUI elements, play media (audio/video), and provide other features. The number of application states for a single application can vary, depending on the application. In some cases, applications can have thousands or millions of different states. An example application that provides restaurant reviews can have one or more states for each restaurant. Similarly, an example application that provides movie reviews can have one or more states for each movie, actor, and director.

FIGS. 4A-4B illustrate an example application state graph that represents an application's states (nodes labeled S#) and transitions (labeled T#) between the states. The transitions between application states are represented by arrows. Double ended arrows may indicate that the user can go back and forth between states (e.g., using the GUI). For example, a user can navigate back and forth between states S1 and S2. Single ended arrows may indicate that a user can transition from a first state to a second state, but may not directly navigate back to the first state from within the second state (e.g., via the GUI). For example, in FIG. 4A, a user may transition from state S7 to state S3, but may not access state S7 directly from state S3. FIG. 4A may only show a portion of the application states available in the application. Accordingly, the presence of additional application states is indicated in FIG. 4A.

FIG. 4B illustrates example transitions T1-T5 between states S1 and S2. As described above, the specific transitions in both directions can be condensed into a single double ended arrow, as illustrated in FIG. 4A. A user may transition between states in a variety of different manners. The transitions T1-T5 may represent any of a variety of ways to transition between states in an application, such as selecting a link, pushing a GUI button, and/or making a menu selection.

The analytics modules 212 can log various events described herein. In some implementations, the analytics modules 212 can log a user accessing states of an application, such as when a user enters a state, leaves a state (e.g., closes the application/window and/or powers off the device), and transitions from one state to another. For example, the analytics modules 212 may log access mechanisms (e.g., accessed URLs and/or selected web/app links) that are indicative of the states/functions a user has accessed. In some implementations, the analytics modules 212 may log a user's interactions (e.g., clicks) with various GUI elements that indicate which states/functions the user has accessed. Example GUI elements may include, but are not limited to, GUI buttons (e.g., an OK button, a back button, etc.), menus (e.g., drop down menus), and other navigational GUI elements. In some implementations, the analytics modules 212 may log application specific and/or OS specific operations indicating the states/functions accessed by the user. For example, the analytics modules 212 may log Android intents/activities that are indicative of states/functions. In some implementations, the analytics modules 212 may log when a user views a state of an application. For example, in some cases, a user may scroll through an application, revealing different states that are viewed during the scrolling. The analytics modules 212 may timestamp the events included in the logs. The timestamps may indicate when the events occurred.

The UF determination system 108 may implement a function ontology that may be used to map function names to application states. The UF determination system 108 may map function names from the function ontology to one or more applications states. For example the UF determination system 108 may map a single function name to multiple states (e.g., thousands of states). As described herein, the mapping of function names to application states can be used for analytics (e.g., to determine usage fraction values) and/or search.

Each application can be associated with a plurality of function names (e.g., a list of function names). The function names associated with an application may be descriptive of the different functionalities provided by the application. The UF determination system 108 can map function names associated with an application to application states of the application (e.g., using mapping instructions 706 of FIG. 7). The function name mapped to a specific state may be descriptive of the state to which the function name is mapped. For example, for a review application (e.g., business and restaurant reviews), the UF determination system 108 can map the function names "show restaurant review" and "show business review" to individual states showing restaurant and business reviews, respectively. As another example, for a movie database application (e.g., the internet movie database IMDb® application), the UF determination system 108 can map the function names "show actor information" and "show movie information" to individual states that show actor information and individual states that show movie information, respectively. As another example, if an application allows the user to reserve restaurant tables, the list of functions associated with the application may include "Reserve Restaurant," and the UF determination system 108 can map the function name "Reserve Restaurant" to different states of the application that provide reservation functionality for different restaurants.

Although the UF determination system 108 may map a single function name to multiple different states in an application, in some cases, the UF determination system 108 may map a single function name to only a single state instead of multiple states. For example, if a movie application includes a single search page, the UF determination system 108 can map the function "Search Movies" to the single search page and may not map the function "Search Movies" to any other states within the application.

In some implementations, the UF determination system 108 and the search system 110 may use a function ontology that is specific (e.g., proprietary) to the systems 108, 110. For example, the search system operator and/or the UF determination system operator may implement a specific function ontology that may or may not be used by other parties. In these cases, the UF determination system 108 can map functions to states according to instructions developed by the UF determination system operator and the search system operator (e.g., the same party in some cases). In some implementations, the UF determination system 108 may use a function ontology provided by another party that assigns functions to states (e.g., an application developer, analytics provider, or other ontology source). In these cases, the UF determination system 108 may map function names according to the other party's rules and the search system 108 may implement the techniques described herein according to the ontology used by the UF determination system 108.

In some implementations, the UF determination system 108 may implement a function ontology that is applicable across multiple applications such that different applications may use the same function names. In this implementation, the UF determination system 108 can apply the same function name to states of different applications. Such a function ontology applied uniformly across a plurality of applications may be referred to as a generic function ontology. The function names of a generic function ontology may be referred to as generic function names. The mapping of generic function names using a generic function ontology may result in a uniform mapping of functions across different applications. This may be the case when application developers (or operators of the UF determination system 108) map function names from the same function name schema. Uniform mapping of function names across different applications may allow for comparison of states from different applications based on the function names assigned to the states. In some implementations, function names used for an application may not be selected from a uniform function ontology that is applied across a plurality of applications. Instead, different applications may use different function naming schemes. Function names used in this type of scheme may be application-specific function names instead of generic function names. Application-specific function names may include the application name along with the function name, thereby indicating the application with which the function is associated.

FIG. 4C illustrates a state/function graph including states and functions from two different applications (A1 and A2).

In FIG. 4C, the notation indicating the application and state is A#-S#. For example, a first state of a first application is labeled A1-S1. A first state of a second application is labeled A2-S1. Note that the states associated with application A2 are shaded.

Functions are illustrated as broken lines around one or more states. The graph shows functions F1-F3 and F4-F5 for applications A1 and A2, respectively, although other functions may be included in applications A1 and A2. The states included with the same function may be assigned the same function name. For example, states A1-S1, A1-S2, and A1-S4 are assigned the function name F1 (e.g., by the UF determination system 108). States A1-S1, A1-S2, and A1-S4 may perform similar functions.

In some cases, a user can transition from a first state having a first function name to a second state having a second function name that is different than the first function name. For example, a transition from state A1-S2 to A1-S3 is a transition from function name F1 to function name F2. In other cases, transitions between states can be within the same function name (e.g., between state A1-S4 and state A1-S2).

The state/function graphs of FIGS. 4A-4C are for illustration purposes only. For example, applications and functions may include a much larger number of states than illustrated. In some cases, a single function may include thousands or millions of different states. Accordingly, the functions and states included in the state/function graphs of FIGS. 4A-4C are merely representations that an application can include one or more functions and each function can include one or more states. The states available in an application and the functions associated with the states may change over time. The UF determination system 108 and the search system 110 may update over time to reflect the changes in application states and functions.

The analytics data may initially be acquired by the user devices 106. Analytics data can be acquired by the user devices in a variety of different manners. In some implementations, a user device 106 can include one or more analytics modules 212 that acquire analytics data. For example, with respect to FIG. 2, native applications 210 can include application analytics modules 212-1 that acquire analytics data. As another example, the user devices 106 may include other modules outside of the installed native applications (e.g., a launcher application or a native application dedicated to analytics acquisition) that acquire analytics data, which may be referred to as device analytics modules 212-2. With respect to device analytics modules 212-2, the analytics provider systems 102 may provide device analytics modules 212-2 for installation on the user devices 106. For example, the analytics provider systems 102 may provide the device analytics modules 212-2 to device manufacturers, launcher application developers, or other parties that may include the device analytics modules 212-2 on the user device 106 outside of other native applications on the user device 106. In some examples, a user device 106 may include a device analytics module 212-2 and one or more application analytics modules 212-1 in one or more applications that acquire analytics data.

Analytics data may be categorized herein as event analytics data, function analytics data, and user engagement analytics data (hereinafter "user analytics data"). Event analytics data, function analytics data, and user analytics data are now described in turn.

Event analytics data refers to analytics data at the event level (e.g., accessing an application state). For example, the event analytics data may describe application usage in terms of application states accessed by users (e.g., in terms of access mechanisms or other device operations). The event analytics data may indicate which states were accessed by users, the time at which the states were accessed by the users (e.g., based on timestamps associated with an event), the amount of time spent by the users within the states, and users' selection of GUI elements (e.g., user selectable links) within the states. Event analytics data may also include data indicating a user's path through states of one or more applications, such as a sequence of states accessed by the users. The events included in the events analytics data may correspond to entry into (e.g., rendering of) an application state or exit from an application state. The UF determination system 108 (e.g., the function mapping module 504) may map function names to the events.

Function analytics data refers to analytics data at the application function level. For example, the function analytics data may describe application usage in terms of functions accessed by users (e.g., in terms of function names). The function analytics data may indicate which functions were accessed by users (e.g., function names), the time at which the functions were accessed by the users (e.g., timestamps associated with function names), the amount of time spent by the users within the functions, and users' selection of GUI elements within the functions. Function analytics data may also include data indicating a user's path through functions of one or more applications, such as a sequence of functions accessed by the users. In some implementations, function analytics data may indicate when a user enters a function and/or exists from a function. The UF determination system 108 can determine usage fraction values based on the function analytics data.

In some implementations, the UF determination system 108 can receive event analytics data and generate function analytics data based on the event analytics data. For example, the UF determination system 108 may map function names to events (e.g., accessing an application state) included in the event analytics data in order to generate the function analytics data. The mappings of functions to events may be stored as function analytics data at the UF determination system 108. In general, the analytics data received at the UF determination system 108 may include event analytics data that is then converted into function analytics data by the UF determination system 108. In some cases, however, the UF determination system 108 may receive function analytics data directly. For example, the UF determination system 108 may receive function analytics data in cases where the analytics modules 212 generate function analytics data at the user devices 106. In other examples, the UF determination system 108 may receive function analytics data in cases where the application developer systems 100 and/or the analytics provider systems 102 map function names to events in the event analytics data received from user devices 106.

User analytics data refers to analytics data indicating an amount of user engagement with an application (e.g., across a plurality of the states/functions of the application). The user analytics data can be generated by the analytics providers, application developers, and/or the UF determination system 108. In some implementations, user analytics data may include the number of users associated with the analytics data received by the UF determination system 108. For example, if event analytics data is collected for one thousand users, then the user analytics data may indicate that one thousand users generated the event analytics data. As another example, the user analytics data may indicate the number of user devices that generated the analytics data. In some implementations, user analytics data may include a number of active users of the application (e.g., number of active monthly users), which may be provided by the application developer systems 100. In some implementations, the analytics data may include other usage metrics, such as the number of times the application was downloaded, which may be provided by the digital distribution platforms 104.

An application analytics module 212-1 may include code inserted into a native application 210 that causes the native application to acquire analytics data. For example, the application analytics modules 212-1 may acquire the event analytics data described herein. In some implementations, the application analytics modules 212-1 may acquire function analytics data. The application analytics modules 212-1 may also acquire user analytics data (e.g., data used to determine user engagement values) indicating an amount of user engagement with the application.

After acquiring the analytics data, the application analytics module 212-1 may store the analytics data on the user device 106 (e.g., in memory of the user device 106) and/or transmit the analytics data for storage and analysis on other systems. In some implementations, the application developer systems 100 may store the analytics data. For example, an application developer system 100 can have a storage system for storing the analytics data acquired from their applications. In some implementations, an analytics provider system 102 can store the analytics data acquired using their analytics modules. For example, an analytics provider system 102 can store analytics data for a plurality of native applications and provide the analytics data to application developer systems upon request.

A device analytics module 212-2 may include a program that acquires analytics data similar to the application analytics modules 212-1 (e.g., event analytics data, function analytics data, and/or user analytics data). After acquiring the analytics data, the device analytics module 212-2 may store the analytics data on the user device 106 (e.g., in memory of the user device 106) and/or transmit the analytics data for storage and analysis on other systems. For example, the device analytics module 212-2 may provide analytics data for a specific application to the application developer system associated with the application. As another example, the analytics provider system can store the analytics data acquired using their analytics module and provide it to the application developer systems 100 and/or the UF determination system 108 upon request.

In some implementations, analytics data may be collected by advertisers (not illustrated) that may then provide the analytics data to the UF determination system 108. For example, the advertisers may advertise links to application states and collect analytics indicating which states were accessed by users. Additional sources of analytics data may be provided by the owner of the search system 110 and/or a partner computing system. In this example, the search system 110 may deliver links to states of applications and collect analytics data indicating which links the users selected. Additional sources of analytics data may be provided by operators of other computing systems that provide user selectable links to users in any manner, such as feeds (e.g., news feeds).

As described above, the analytics data collected by the analytics modules 212 can be stored on at least one of the user devices 106, the application developer systems 100, and the analytics provider systems 102. The UF determination system 108 can retrieve the analytics data from the user devices 106, the application developer systems 100, and/or the analytics provider systems 102. For example, the operators of the UF determination system 108 may enter into partnership arrangements where application developers provide analytics data to the owners of the search system 110 and the UF determination system 108 in order to improve relevance of search results associated with their applications. Although the search system 110 and UF determination system 108 can be operated by the same party (e.g., the same business), in some implementations, the search system 110 and UF determination system 108 can be operated by separate parties. For example, one or more of the analytics provider systems 102 may include the functionality of the UF determination system 108 described herein. In these implementations, the search system 110 may retrieve the usage fraction values from the UF determination system 108 according to an agreement between the search system operator and the UF determination system operator.

The UF determination system 108 can retrieve the analytics data in batches. For example, the UF determination system 108 can retrieve batches of analytics data at preset times (e.g., at regular time intervals). Additionally, or alternatively, the UF determination system 108 can retrieve the analytics data when a predetermined amount of analytics data is available, such as when analytics data is available for a predetermined number of users, predetermined number of events, and/or predetermined number of functions. The batches of analytics data may include data for a plurality of users that have accessed a plurality of different states in different applications. In some cases, the batches of data may include data from a single application (e.g., analytics data for a plurality of users that accessed a plurality of states in the application). In some implementations, the UF determination system 108 can retrieve the analytics data in real time as the data is collected for an application, instead of in batches.

The UF determination system 108 (e.g., the UF determination module 506) determines the usage fraction values for a plurality of applications based on the analytics data (e.g., the event analytics data, function analytics data, and user analytics data). For example, the UF determination system 108 can determine event-based and/or time-based usage fraction values based on the analytics data. The UF determination system 108 may also determine user engagement values based on the user analytics data. The search system 110 (e.g., the record generation/update module 510) can update the search records (e.g., search records 516) that are used for search based on the determined usage fraction values and the determined user engagement values. The search system 110 can then generate search results based on the usage fraction values and the user engagement values. An example UF determination system 108 and search system 110 are described with respect to FIG. 5.

Figure 5:
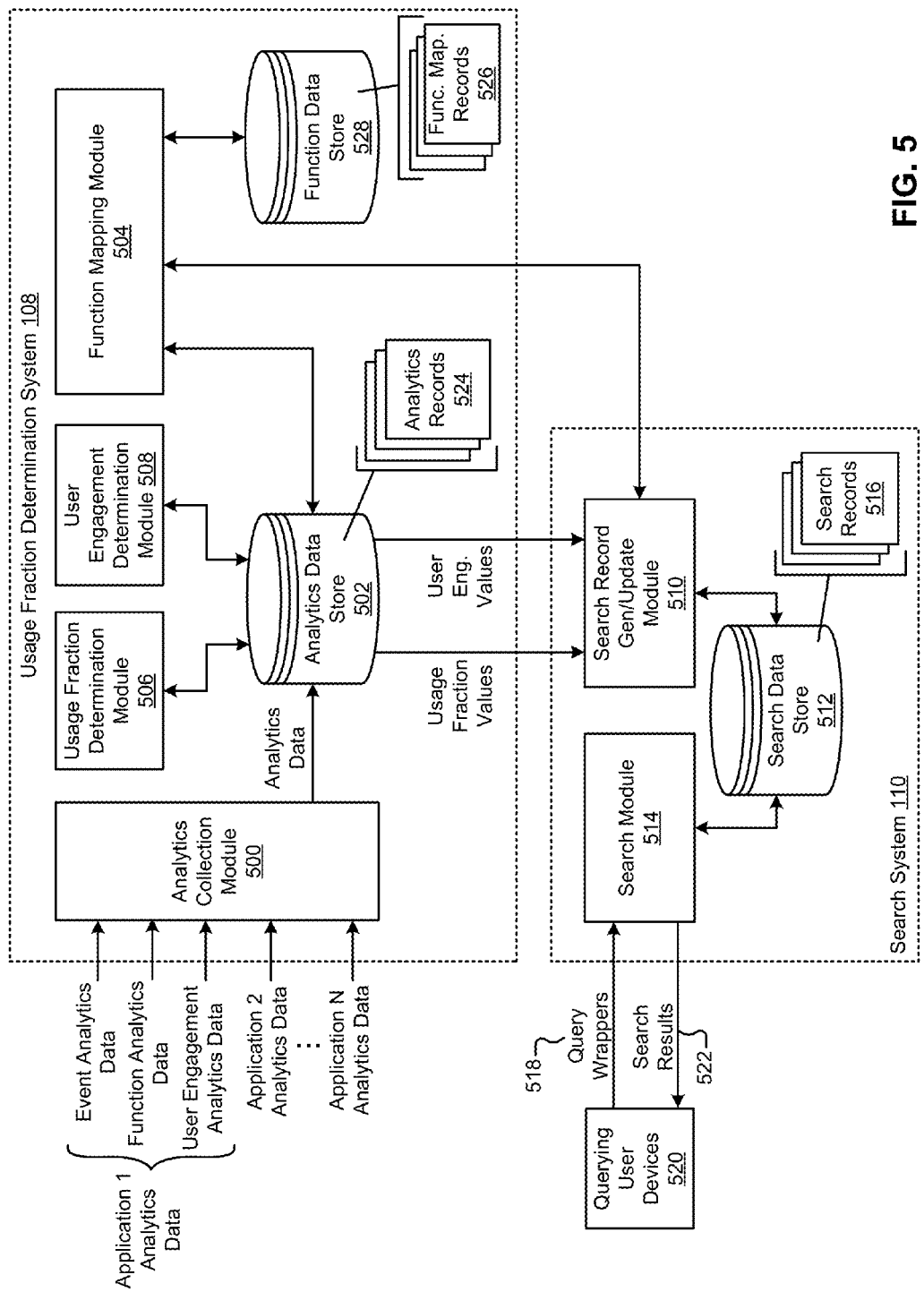
FIG. 5 is a functional block diagram of an example usage fraction determination system and an example search system.

Referring to FIG. 5, the UF determination system 108 includes an analytics collection module 500, an analytics data store 502, a function mapping module 504, and a usage fraction determination module 506 (hereinafter "UF determination module 506"). The analytics collection module 500 retrieves analytics data and stores the analytics data in the analytics data store 502. The function mapping module 504 maps function names to the events (e.g., states) of the analytics data to generate function analytics data. The UF determination module 506 determines usage fraction values based on the function analytics data. A user engagement determination module 508 (hereinafter "engagement determination module 508") may determine user engagement values based on the user analytics data.

The search system 110 includes a record generation/update module 510 (hereinafter "record generation module 510"), a search data store 512, and a search module 514. The record generation module 510 retrieves usage fraction values and/or user engagement values from the UF determination system 108 and updates search records 516 stored in the search data store 512 to include the values. In some implementations, the record generation module 510 may update search records 516 to include metadata (e.g., keywords) based on the functions associated with the search records 516 (e.g., states represented by the search records 516). The search module 514 receives a query wrapper 518 (e.g., including a search query) from a querying user device 520 and generates search results 522 based on the received query wrapper 518, the usage fraction values, and/or the user engagement values. The search module 514 then transmits the search results 522 to the querying user device 520.

The analytics collection module 500 retrieves analytics data from at least one of the user devices 106, the analytics provider systems 102, and the application developer systems 100. In general, the analytics data received by the analytics collection module 500 may include any data that can be used by the UF determination system 108 to determine the various usage fraction values described herein. The analytics collection module 500 may store the analytics data in analytics records 524 in the analytics data store 502. The analytics data retrieved by the analytics collection module 500 may include event analytics data, function analytics data, and/or user analytics data. In some cases, the analytics collection module 500 may retrieve event analytics data and the function mapping module 504 may generate function analytics data based on the event analytics data. In other cases, the analytics collection module 500 may receive function analytics data directly from the user devices 106, the analytics provider systems 102, and/or the application developer systems 100.

Figure 6:
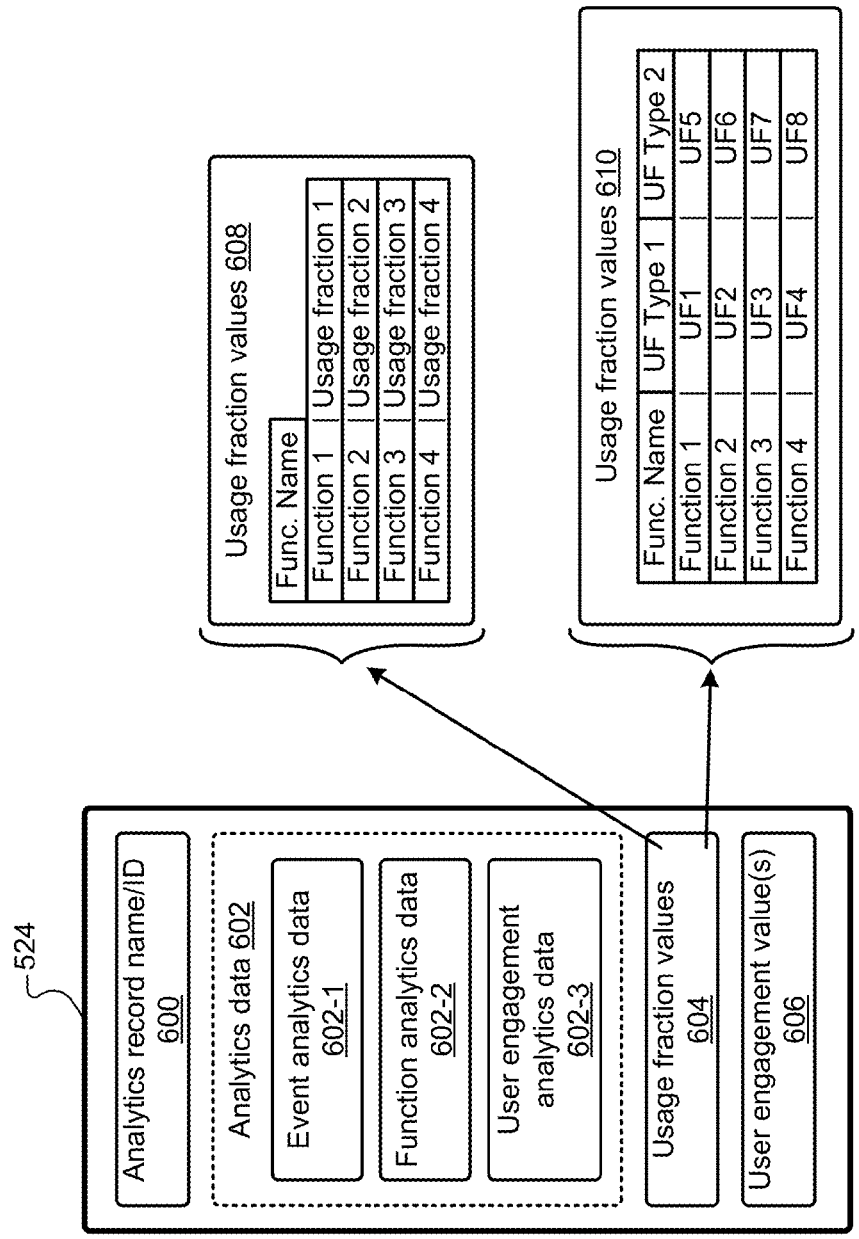
FIG. 6 illustrates an example analytics record.

FIG. 6 illustrates an example analytics record 524. The analytics record 524 may represent analytics data and various values associated with a single application. The analytics data store 502 stores a plurality of such analytics records 524, each of which may correspond to a different application. The analytics data store 502 (e.g., the analytics records 524) may be updated and/or accessed by modules of the UF determination system 108 and the search system 110. The records described herein (e.g., the analytics records 524, function mapping records 526, and search records 516) represent data stored in the data stores (e.g., the analytics data store 502, function data store 528, and search data store 512). The data stores may include a variety of different data structures that are used to implement the techniques of the present disclosure, such as one or more databases, indices (e.g., inverted indices), tables, files, or other data structures.

The analytics record 524 includes an analytics record name/ID 600 (hereinafter "analytics record ID 600") that identifies the analytics record 524 (e.g., uniquely identifies) among the other analytics records in the analytics data store 502. In implementations where the analytics data store 502 includes a single analytics record 524 for a single application, the analytics record ID 600 may identify the application with which the analytics data and values of the analytics record 524 is associated. In some cases, the analytics record ID 600 may include the application name and application edition with which the analytics record 524 is associated. For example, the analytics record ID 600 may include an application ID that uniquely identifies the application edition with which the analytics record 524 is associated. As described hereinafter, it can be assumed that an analytics record 524 represents analytics data and values for a single application.

The analytics record 524 includes analytics data 602 for the application. For example, the analytics record 524 may include event analytics data 602-1, function analytics data 602-2, and user analytics data 602-3. The analytics data 602 included in the analytics record 524 may be retrieved from a variety of different sources. The analytics record 524 may also include usage fraction values 604 and user engagement values 606 for the application. Retrieval and determination of the analytics data, usage fraction values, and engagement values is described herein.

Referring to FIG. 5, the function mapping module 504 maps function names to events (e.g., accessed application states). As described herein, the analytics data including function names (e.g., mapped to events) may be referred to as function analytics data. Accordingly, an example source of function analytics data may be the mapping of function names to event analytics data, as provided by the function mapping module 504. In other cases, function analytics data may be provided by at least one of the user devices 106, the analytics provider systems 102, and the application developer systems 100. The function mapping module 504 may retrieve event analytics data from the analytics data store 502 (e.g., analytics records 524) and map function names to events in the events analytics data. The function mapping module 504 may map function names to events based on data included in function mapping records 526 stored in the function data store 528.

Figure 7:
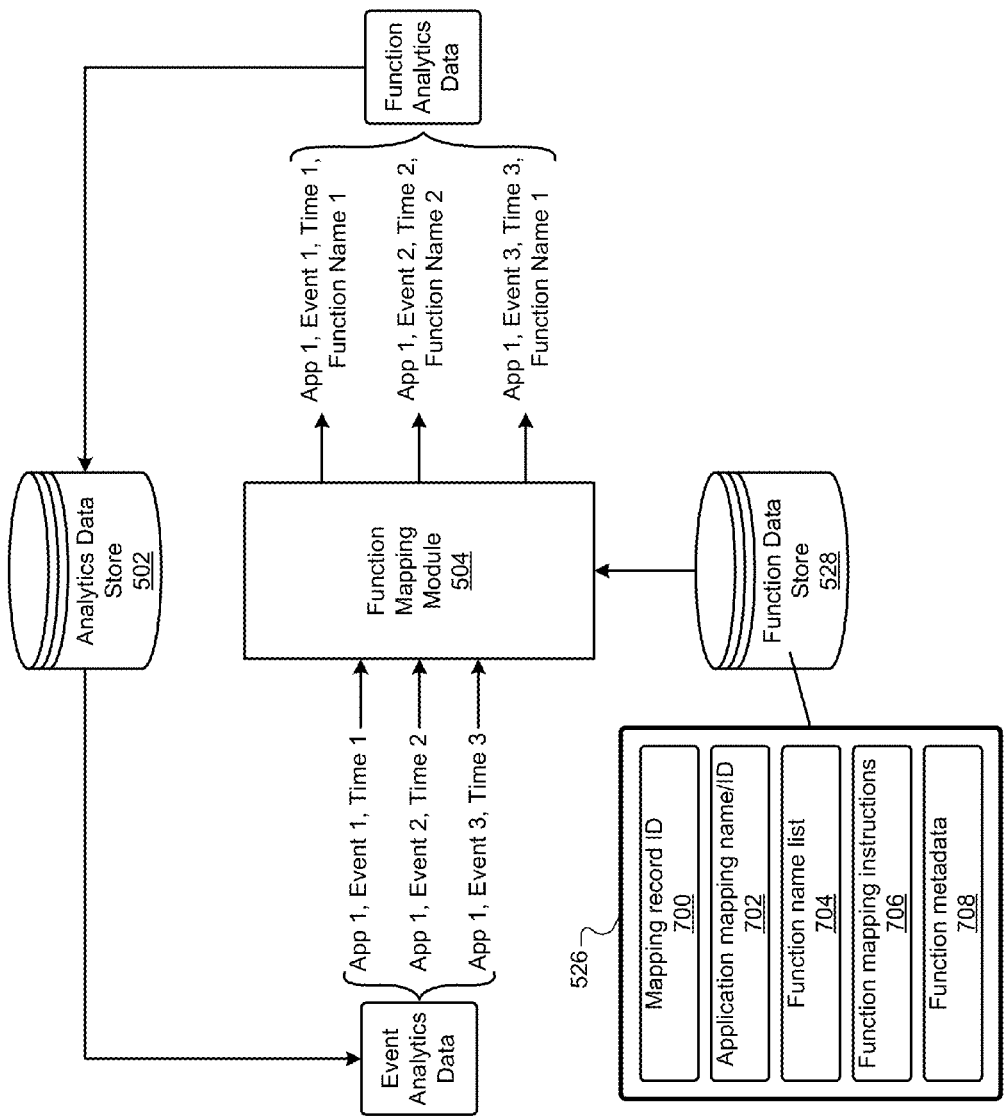
FIG. 7 illustrates an example function mapping module that retrieves event analytics data and generates function analytics data.

FIG. 7 illustrates an example function mapping record 526. A function mapping record 526 may include data indicating how to map function names to events (e.g., an opening of an application state) for an application (e.g., a single native application). The function data store 528 may include a plurality of function mapping records similar to the function mapping record 526 of FIG. 7, each of which may include data indicating how to map function names to events for a respective application.

The function mapping record 526 may include a mapping record ID 700 that identifies the mapping record 526 (e.g., uniquely identifies) among the other mapping records in the function data store 528. The function mapping record 526 may also include an application mapping name/ID (hereinafter "app mapping ID 702"). The app mapping ID 702 may indicate the application with which the function mapping record 526 is associated. For example, the app mapping ID 702 may indicate the application with which the function name list 704 and the function mapping instructions 706 are associated. In some implementations, the app mapping ID 702 may correspond to an application named in the analytics record name/ID 600. For example, if an application that provides restaurant reviews is named "ReviewsApp," then the analytics record and the function mapping record for the "ReviewsApp" may include an analytics record ID and an app mapping ID that reference the "ReviewsApp" (e.g., include an identifier for the ReviewsApp and/or the name "ReviewsApp").

The function name list 704 includes list of function names associated with the application referenced by the app mapping ID 702. The list of functions may include those functions that can be mapped to event analytics data by the function mapping module 504. For example, a review application that provides reviews of businesses (e.g., the YELP® application developed by Yelp, Inc.) may have a list of function names that include "Read Restaurant Review," "Read Store Review," "Provide Restaurant Info," "Show menu," and "Show food photos." As another example, a mapping and navigation application may have a list of function names that include "Find transportation to location," "Driving Directions," "Walking Directions," and "Show nearby gas stations."

The function mapping record 526 includes function mapping instructions 706 (hereinafter "mapping instructions 706"). The mapping instructions 706 (e.g., rules) indicate how the function names of the function name list 704 can be mapped to events included in the event analytics data. The function mapping module 504 maps the function names of the function name list 704 to events in the event analytics data based on the mapping instructions 706. For example, the function mapping module 504 may retrieve an event for an application from event analytics data, retrieve the function mapping record for the application, and then map (e.g., assign) a function name to the event based on mapping instructions that indicate which function name to map to the event. The function mapping module 504 may store the mapping of the function name to the event in the analytics data store 502 as function analytics data. In this manner, the function mapping module 504 may generate function analytics data based on event analytics data. For example, the function mapping module 504 may perform mappings for batches of events (e.g., for single or multiple applications). As another example, the function mapping module 504 may perform mappings for events as the events are received by the analytics collection module 500 (e.g., in real time).

As described above, events may indicate accessed application/web states (e.g., access mechanisms such as URLs) that correspond to functions, application/OS operations that are indicative of functions (e.g., an Android intent/activity that launches a screen of an application), user inputs that are indicative of a state/function (e.g., selection of GUI input elements), and/or other types of events, such as analytics module specific events (e.g., specific events coded by the analytics developers). The mapping instructions 706 may vary depending on what information is included in the event analytics data. In some implementations, the mapping instructions 706 may include instructions for mapping function names to application/web states (e.g., access mechanisms) if application/web states are indicated in the event analytics data. For example, the mapping instructions 706 may instruct the function mapping module 504 to map function names based on the domain of the access mechanism and the path of the access mechanism. In some implementations, the mapping instructions 706 may include instructions for mapping function names to application/OS operations if application operations are indicated in the event analytics data. For example, the mapping instructions 706 may instruct the function mapping module 504 to map function names to specific operations, such as specific Android intents/activities. In some implementations, the mapping instructions 706 may include instructions for mapping function names to user inputs, such as the selection of GUI elements having specific functionality (e.g., a search button or a category selection button), if the selection of GUI elements is indicated in the events analytics data. The types of events included in the event analytics data may also vary based on the level of access the analytics module 212 has to acquire analytics data. For example, an application analytics module 212-1 included in a native application may have a greater level of access to determine particular application states and operations of the native application than a device analytics module 212-2 that is not associated with (e.g., coded into) the application.

In some cases, the analytics data received by the analytics collection module 500 includes function analytics data (e.g., analytics data with mapped function names). In these cases, the function analytics data may include mapped function names upon receipt at the analytics collection module 500 and may be stored in the analytics records 524 without any additional mapping operations being performed by the function mapping module 504.

FIG. 7 illustrates the function mapping module 504 mapping function names to various events. Specifically, the function mapping module 504 retrieves three events from event analytics data. The retrieved events are for an application named "App 1." Each of the events includes a timestamp, labeled as Time 1, Time 2, and Time 3. The timestamps indicate the time at which the events occurred. The function mapping module 504 retrieves the function mapping record for App 1 and maps function names from the function name list to the events according to the function mapping instructions for App 1. In FIG. 7, Function name 1 maps to Event 1 and Event 3. Function name 2 maps to Event 2. The function mapping module 504 may generate function analytics data for a plurality of events for each of a plurality of applications as described above. In terms of the graph of FIG. 4C, the sequence of 3 events may be the entry into state A1-S2 at Time 1 followed by entry into state A1-S3 at Time 2 and the return to either state A1-S2 or transition to Al-S1 at Time 3. Such a path through the graph of FIG. 4C would transition from A1-F1 to A1-F2 and back to A1-F1.

The UF determination module 506 may determine the amount of time that was spent in an event (e.g., in a state/function) based on the timestamps for single events indicating when the events occurred. For example, assuming that Event 1, Event 2, and Event 3 occur in sequence, the timestamps Time 1, Time 2, and Time 3 may be sequential. The difference between Time 3 and Time 2 may indicate an amount of time the user spent in Function Name 2. Accordingly, the UF determination module 506 can determine the amount of time spent in Function Name 2 based on the difference between Time 3 and Time 2. Although the UF determination module 506 may determine the amount of time spent in an event/function in some cases, in other cases, the event/function analytics data received by the analytics collection module 500 may already indicate the amount time spent in the event/function.

In some implementations, the function mapping record 526 may include function metadata 708. The function metadata 708 may include metadata associated with each of the function names in the function name list. The metadata associated with a function name may include various terms (e.g., words and/or phrases) that are associated with the function name and may provide context as to the meaning of the function name. For example, if the function name is "Navigate to a location," the metadata associated with the function name may include terms related to navigating to a location, such as "directions," "map," "car," "on foot," and "by bike." The terms in the function metadata 708 may be words that are commonly associated with the functions. In some examples, the function metadata 708 may include terms that are commonly used to search for states and applications that provide the functions. As such, the function metadata 708 may include a group of terms that may enhance search relevance when assigned to the search records 516. The function metadata can be generated manually and/or automatically.

Referring to FIG. 5, the UF determination module 506 determines usage fraction values based on the function analytics data. For example, the UF determination module 506 may retrieve function analytics data for a single application and determine one or more types of usage fraction values for the application. The UF determination module 506 may store the usage fraction values in the analytics record 524 for the application.

As described herein, each application has a set of associated function names. The UF determination module 506 can determine a usage fraction value for each of the function names associated with the application. The usage fraction value may indicate an amount of usage of the function with which the usage fraction value is associated. Put another way, a usage fraction value may indicate the amount of interaction a user has with an application function relative to other functions of the application. The usage fraction value may be expressed as a percentage value indicating how much the function is used relative to other functions of the application. The usage fraction values for a list of functions may add up to one (e.g., 100%). For example, for an application that has three functions (i.e., function names), there may be three usage fraction values (i.e., one for each function). In this example, the three usage fraction values may add up to one.

The UF determination module 506 may calculate different types of usage fraction values (e.g., a time-based usage fraction value and/or an event-based usage fraction value). The different types of usage fraction values may reflect the different ways in which application usage can be quantified. One type of usage fraction value described herein may be referred to as a time-based usage fraction value. The time-based usage fraction value may indicate the amount of time users spent accessing one function of an application relative to other functions of the application. For example, a time-based usage fraction value may indicate how much time users spent in states associated with a particular function relative to the time the users spent in states associated with other functions of the application.

Another type of usage fraction value described herein may be referred to as an event-based usage fraction value. An event-based usage fraction value may indicate how users access states associated with an application's functions and navigate through states associated with the functions. An example event-based usage fraction value may indicate how many times states of a first function are accessed relative to states of other functions. For example, the UF determination module 506 may calculate a total number of times functions (e.g., states) of the application were accessed and then determine an event-based usage fraction value for each function by determining the fraction of total accesses that are attributable to each function. The UF determination module 506 can determine a variety of different types of event-based usage fractions.

In some cases, a set of function names can be associated with more than one type of usage fraction value in the analytics record 524. For example, if the UF determination module 506 calculates two different usage fraction values for an application, each function name for the application may have two assigned usage fraction values. More specifically, if an application includes three functions, each of the three functions may be assigned two usage fraction values. The sum of usage fraction values for each type of usage fraction may be one (e.g., 100%). In an example where an application includes three functions and two types of usage fraction values, the sum of the usage fraction values for the first type may be one. Additionally, the sum of the usage fraction values for the second type of usage fraction value may be one. FIG. 6 illustrates two different examples of usage fraction values assigned to function names. In a first example at 608, the application is associated with four function names. Each of the function names is associated with one usage fraction value. The four usage fraction values at 608 may add up to one. In a second example at 610, the application is associated with two different types of usage fraction values. Usage fraction values UF1-UF4 are a first type of usage fraction value. Usage fraction values UF1-UF4 may add up to one. Usage fraction values UF5-UF8 are a second type of usage fraction value that is different than the first usage fraction value. Usage fraction values UF5-UF8 may add up to one.

Figure 8:
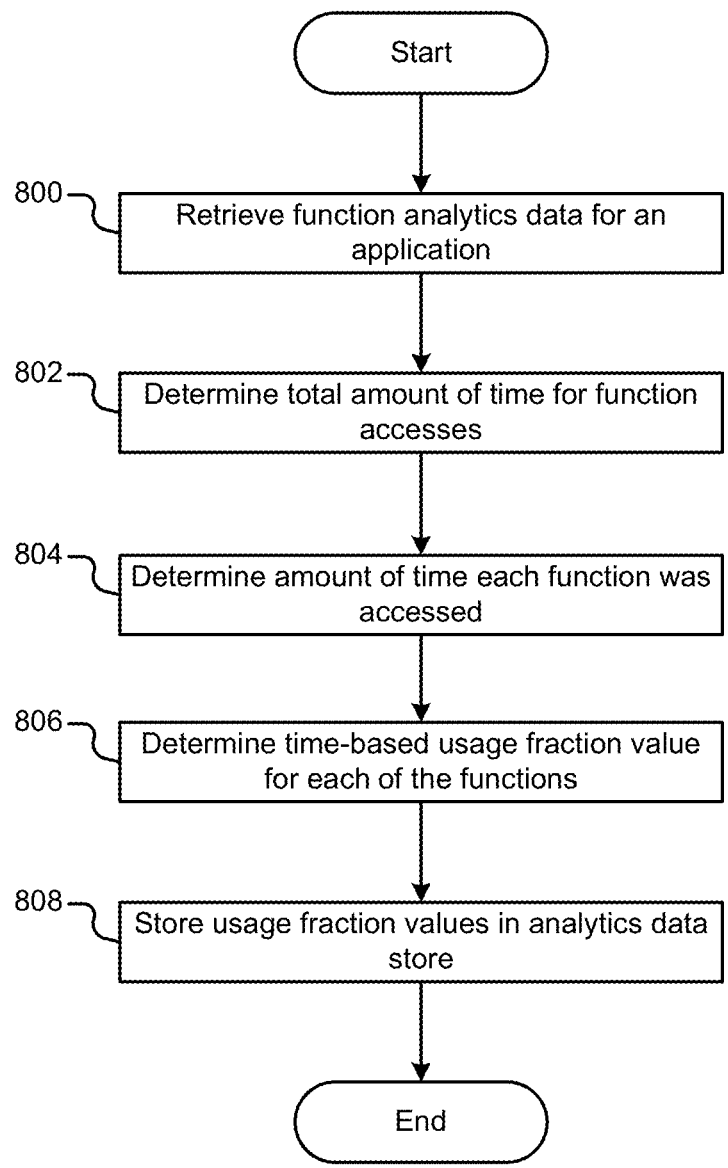
FIGS. 8-9 are flow diagrams illustrating example methods for generating time-based usage fraction values and event-based usage fraction values.
Figure 9:
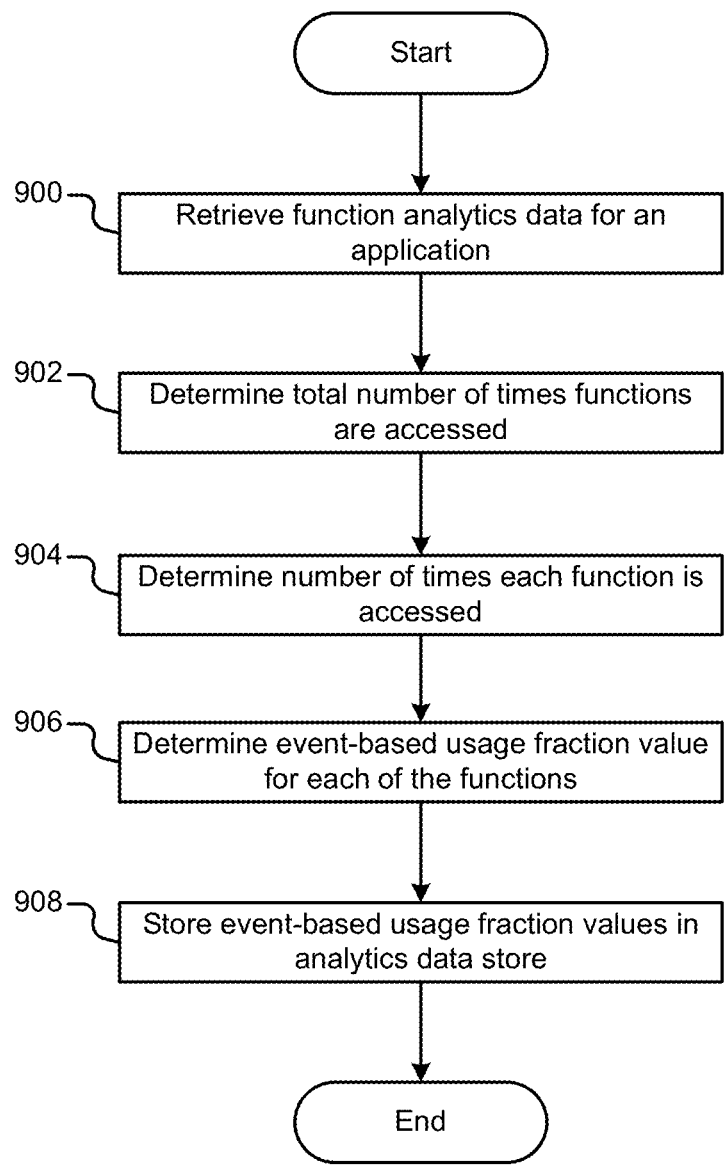

FIGS. 8-9 illustrate methods for determining usage fraction values. FIG. 8 illustrates an example method for generating time-based usage fraction values for an application. The method of FIG. 8 is now described with reference to the UF determination system of FIG. 5. At block 800, the analytics collection module 500 retrieves function analytics data for an application. At block 802, the UF determination module 506 determines a total amount of time spent by users across the set of functions for the application. At block 804, the UF determination module 506 determines the amount of time spent by users within each of the functions for the application. At block 806, for each function of the application, the UF determination module 506 determines a time-based usage fraction value by dividing the time spent in the function by the total amount of time spent by users across the set of functions for the application. In block 808, the UF determination module 506 stores the time-based usage fraction values in the analytics data store 502. The UF determination module 506 can perform the method of FIG. 8 for a plurality of applications to generate time-based usage fraction values for the plurality of applications.

FIG. 9 illustrates an example method for generating event-based usage fraction values for an application. The method of FIG. 9 is now described with reference to the UF determination system of FIG. 5. At block 900, the analytics collection module 500 retrieves function analytics data for an application. At block 902, the UF determination module 506 determines a total number of times users accessed the set of functions for the application. At block 904, the UF determination module 506 determines the number of times each of the functions was accessed. At block 906, for each function of the application, the UF determination module 506 determines an event-based usage fraction value by dividing the number of times the function was accessed by the total number of times users accessed the set of functions for the application. At block 908, the UF determination module 506 stores the event-based usage fraction values in the analytics data store 502. The UF determination module 506 can perform the method of FIG. 9 for a plurality of applications to generate event-based usage fraction values for the plurality of applications.

Although the method of FIG. 9 describes calculating an event-based usage fraction value based on the total number of times functions were accessed, in other examples, other types of event-based usage fractions can be determined. For example, in some implementations, the event-based usage fraction values can be based on the total number of times users entered into functions, as opposed to the number of times the functions were accessed. More specifically, if a user first enters a function and then transitions to other states of the same function, such a series of transitions (e.g., a sequence of states) may be counted as a single event for the purposes of calculating an event-based usage fraction value. This is in contrast to the calculation of FIG. 9 where the UF determination module 506 may count each accessed function as an event for the purposes of calculating the event-based usage fraction values.

Although usage fraction values may be determined based on analytics data collected for a plurality of different users, in some implementations, the UF determination system 108 may determine usage fraction values for a single user. For example, the UF determination module 506 may determine time-based usage fraction values and/or event-based usage fraction values for an individual user based on event analytics data and function analytics data collected for the individual user.

The engagement determination module 508 determines one or more user engagement values for each application. The user engagement values indicate an amount of users that have engaged with an application. The engagement determination module 508 may determine a user engagement value that indicates the number of users for which analytics data was collected for the application. For example, the engagement determination module 508 may determine the user engagement value based on the number of users associated with the analytics data used to determine the usage fraction values. Additionally, or alternatively, the engagement determination module 508 may determine user engagement values using other data. In some implementations, the engagement determination module 508 may determine a user engagement value based on the number of times the application was downloaded from a digital distribution platform 104. In some implementations, the engagement determination module 508 may determine a user engagement value based on the number of active users of the application (e.g., the number of daily active users and/or monthly active users). The engagement determination module may store one or more user engagement values in the analytics data store 502.

Figure 10:
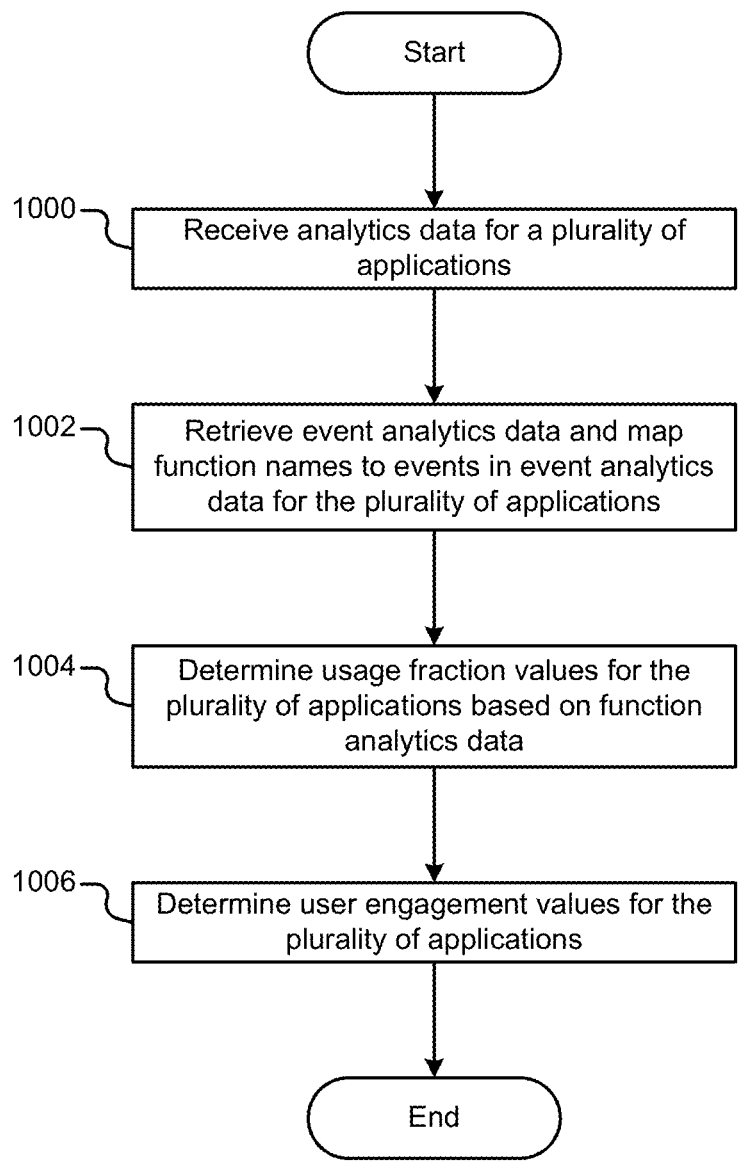
FIG. 10 is a flow diagram illustrating example operations performed by a usage fraction determination system.

FIG. 10 illustrates an example method describing operation of the UF determination system 108 with respect to a plurality of applications. At 1000, the analytics collection module 500 receives analytics data for a plurality of applications over time and may store the analytics data in the analytics data store 502. At 1002, the function mapping module 504 retrieves event analytics data and maps (e.g., assigns) function names to events in the event analytics data to generate function analytics data. At 1004, the UF determination module 506 determines usage fraction values for the plurality of applications based on the function analytics data. At 1006, the engagement determination module 508 may optionally determine one or more user engagement values for the plurality of applications.

Referring to FIG. 5, the search system 110 receives query wrappers 518 (e.g., search queries) from user devices 520 (which may be referred to as "querying user devices 520"), generates search results 522 in response to the query wrappers 518, and transmits the search results to the user devices 520. The search system 110 may use values determined by the UF determination system 108 in order to generate the search results 522. For example, the search system 110 may generate the search results 522 based on usage fraction values, user engagement values, and/or function metadata received from the UF determination system 108. The user device 520 may render the search results 522 as user selectable links on a search engine results page (SERP) which the user may select in order to access states of native/web applications.

The search system 110 includes a search module 514, a search data store 512, and a record generation module 510. The search module 514 receives the query wrapper 518 (e.g., including a search query) from a user device 520 and generates search results 522 based on data included in the search data store 512. The search data store 512 includes search records 516 (e.g., search records of FIGS. 12A-12B) that include data used during search and for generating search results 522. For example, the search records can include data related to application states and/or functions. The search results 522 can include native application states, web pages, images, videos, and other types of search results.

The record generation module 510 generates the search records 516. The record generation module 510 may retrieve data from data sources and generate the search records 516. The record generation module 510 may also retrieve data from the UF determination system 108 and generate portions of the search records 516 to enhance the data included in the search records 516 with data generated by the UF determination system 108. For example, the record generation module 510 may insert one or more usage fraction values, one or more user engagement values, and/or function metadata in the search records 516 for use during search.

Figure 13:
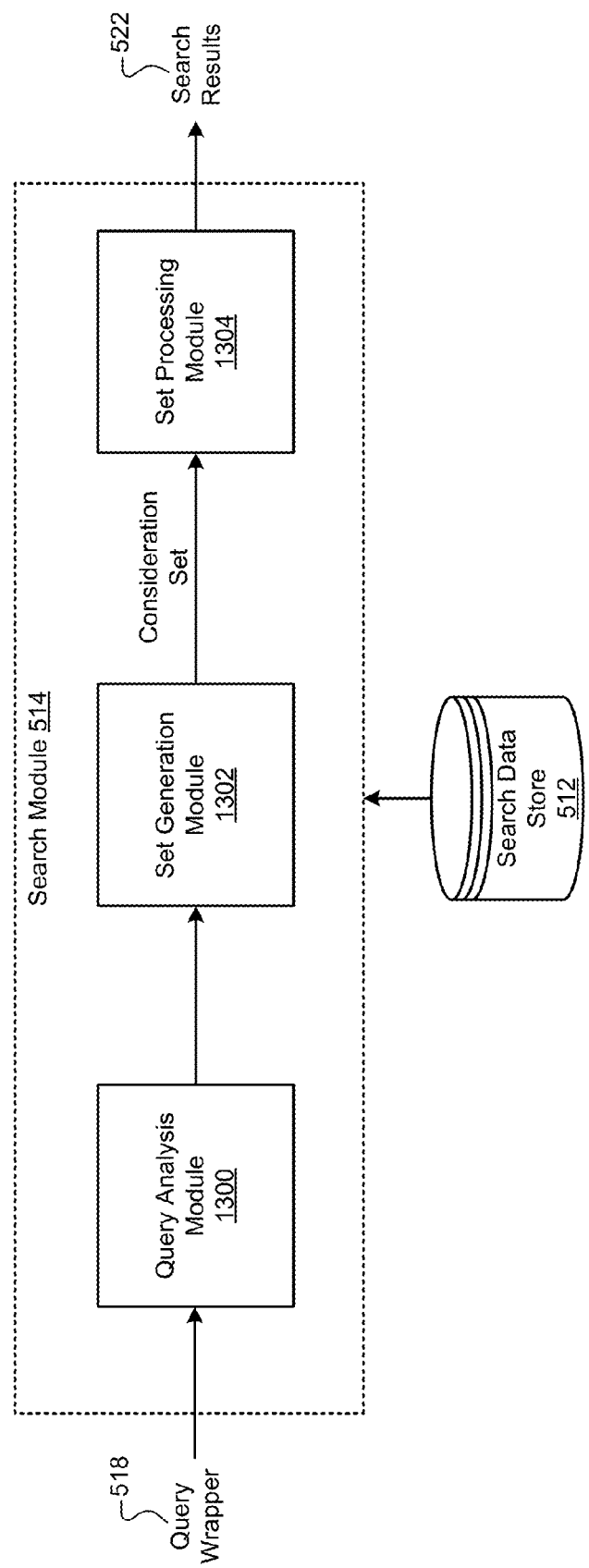
FIG. 13 illustrates an example search module.
Figure 14:
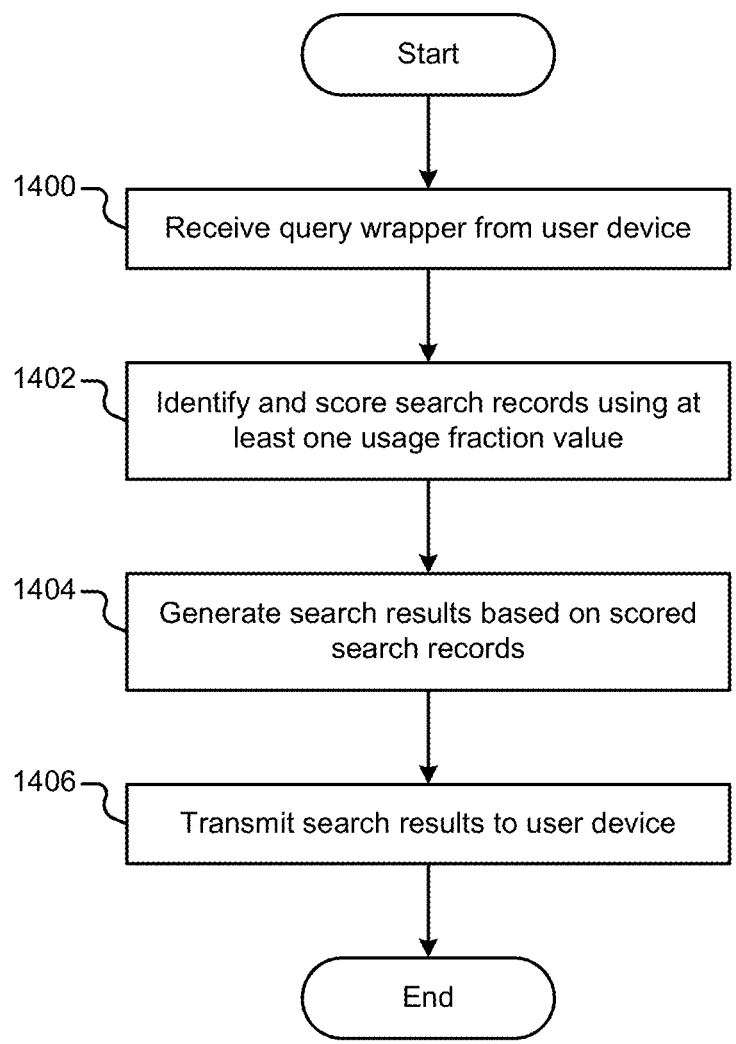
FIG. 14 is a flow diagram illustrating an example method for performing a search.

Search system operation is described hereinafter in detail with respect to FIGS. 11-14. FIG. 11 illustrates an environment including a querying user device 520 and a search system 110 that generates search results 522 for the user device 520. FIG. 12 illustrates example search records 516-1, 516-2 stored in the search data store 512. FIGS. 13-14 describe operation of an example search module 514.

FIG. 11 illustrates an example user device 520 that transmits a query wrapper 518 to the search system 110 via the network 112 and receives search results 522 from the search system 110. As described herein, analytics data may be retrieved from a plurality of user devices 106. Some of the plurality of user devices 106 may optionally interact with the search system 110. A user device 520 that interacts with the search system 110 to retrieve search results 522 may be referred to herein as a "querying user device 520." In some cases, querying user devices 520 may provide analytics data via analytics modules 212. In other cases, querying user devices 520 may not include the analytics modules 212 and/or provide analytics data. For example, the UF determination system 108 may generate the usage fraction values, user engagement values, and function metadata based on interaction with a first set of user devices 106 that provide analytics data and the search system 110 may provide results to a plurality of querying user devices 520 not included within the first set of user devices 106 that provided the analytics data.

In some examples, user devices 520 may communicate with the search system 110 via a partner computing system (not illustrated). The partner computing system may be a computing system of a third party that may leverage the search functionality of the search system 110. The partner computing system may belong to a company or organization other than that which operates the search system 110. Example third parties that may leverage the functionality of the search system 110 may include, but are not limited to, interne search providers and wireless communications service providers. The user devices 520 may send search queries to the search system 110 and receive search results via the partner computing system. The partner computing system may provide a user interface to the user devices 520 in some examples and/or modify the search experience provided on the user devices 520.

In general, a user device 520 may communicate with the search system 110 using any application that can transmit search queries to the search system 110. In some examples, a user device 520 may execute a native application that is dedicated to interfacing with the search system 110, such as a native application dedicated to searches (e.g., search application 1100). In some examples, a user device 520 may communicate with the search system 110 using a more general application, such as a web-based application accessed using the web browser application 1102 (e.g., a web search). In still other examples, the functionality attributed to the search application 1100 herein may be included as a searching component of a larger application that has additional functionality. For example, the functionality attributed to the search application 1100 may be included as part of a native/web application as a feature that provides search for the native/web application. Although the user device 520 may communicate with the search system 110 using a web based application and/or a native search application, the user device 520 may be described hereinafter as using the native search application 1100 to communicate with the search system 110.

The search application 1100 may display a search field on a graphical user interface (GUI) in which the user can enter search queries 1104. The user may enter a search query 1104 into the search field (e.g., a search box) using a touchscreen or physical keyboard, a speech-to-text program, or other form of user input. In general, a search query 1104 may be a request for information retrieval (e.g., search results 522) from the search system 110. For example, a search query may 1104 be directed to retrieving a list of links to application states in examples where the search system 110 is configured to generate a list of access mechanisms 1106 as search results. A search query 1104 may include text, numbers, and/or symbols (e.g., punctuation) entered into the user device 520 by the user.

The user device transmits a query wrapper 518 to the search system 110 that may include a search query 1104. The query wrapper 518 may include additional data along with the search query 1104. For example, the query wrapper 518 may include geo-location data 1108 that indicates the location of the user device 520 (e.g., latitude/longitude coordinates). The query wrapper 518 may also include additional data, including, but not limited to, platform data 1110 (e.g., version of the operating system 1112, device type, and web-browser version), an identity of a user of the user device 520 (e.g., a username), partner specific data, ISP/hostname, and other data.

A user device 520 receives a set of search results 522 from the search module 514 that are responsive to the query wrapper 518. The search results 522 received from the search module 514 may include one or more access mechanisms 1106, result scores 1114, and link data 1116. The user device 520 (e.g., the search application 1100) renders user selectable links 1118 based on the received search results 522 (e.g., links 1118-1, 1118-2, . . . , 1118-6 of FIG. 11). For example, the user device 520 may render user selectable links based on the link data 1116. The link data 1116 may include data for rendering the user selectable links, such as text and/or image data to be included in the user selectable link 1118. Example link data 1116 may include text and images including, but not limited to, application names associated with the access mechanisms 1106, text describing application states accessed using the access mechanisms 1106, images associated with the application referenced by the access mechanisms 1106 (e.g., application icons), and images associated with the application states (e.g., application screen images) defined by the access mechanisms 1106.

Each user selectable link 1118 displayed to the user may include an access mechanism and be associated with a result score that indicates the relevance of the user selectable link 1118 (e.g., access mechanism) to the search query 1104. A user may select a user selectable link 1118 by interacting with the link (e.g., touching or clicking the link). In response to selection of a link, the user device 520 may launch the application (e.g., native application or web application) referenced by the access mechanism 1106 associated with the user selectable link 1118 and set the application into a state specified by the access mechanism 1106.

FIG. 11 illustrates an example list of user selectable links 1118 that a user device 520 may display to a user. Specifically, FIG. 11 includes user selectable links 1118 included in search results for the search query "subway." The user selectable links 1118 are rendered based on link data 1116 including text, such as entity names (e.g., Subway® restaurants) and application names (e.g., YELP® and WIKIPEDIA®) indicating an application state that may be accessed in response to selection of the user selectable links 1118.

The search data store 512 includes a plurality of search records 516. The search module 514 may use data included in search records 516 in order to generate the search results 522. For example, the search module 514 may identify a plurality of search records 516 based on the data included in the query wrapper 518 and then filter/score the identified search records 516 based on the data included in the search records 516. The search module 514 may then generate search results 522 based on the scored search records 516.

Figure 12B:
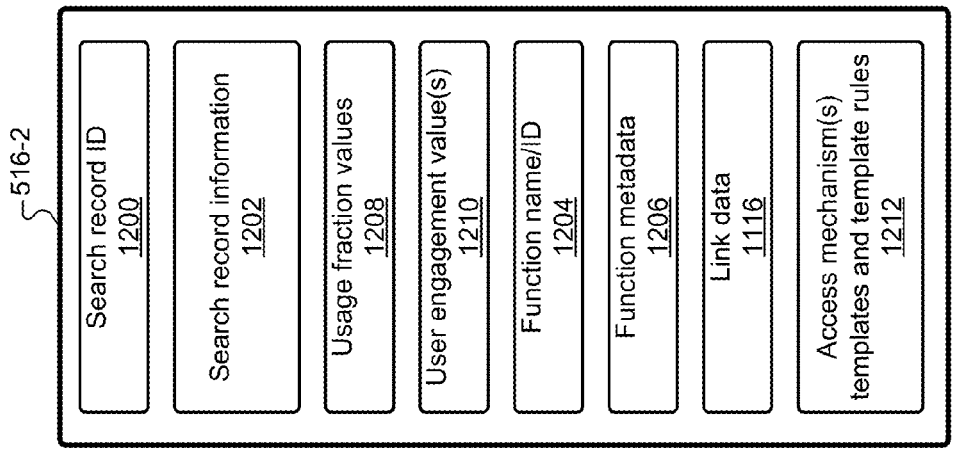
FIGS. 12A-12B illustrate example search records.
Figure 12A:
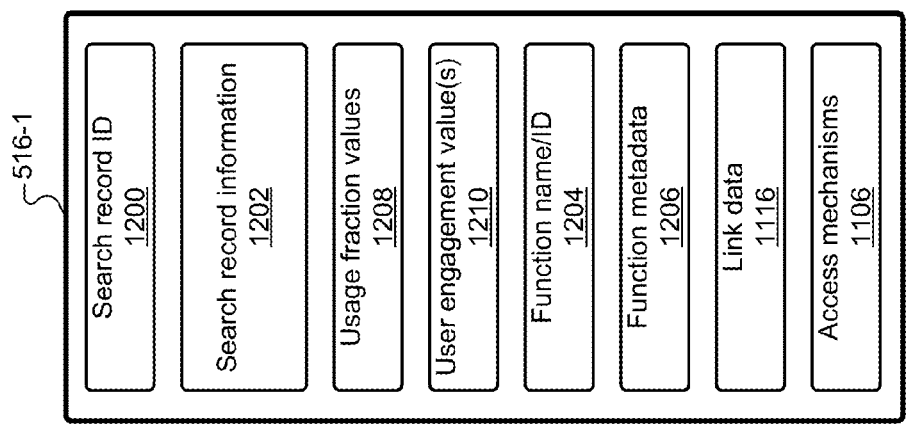

FIGS. 12A-12B illustrate example search records 516-1, 516-2 that may be included in the search data store 512. Each search record 516 may include data related to a state of a native/web application, or data related to any other relevant search result that may be delivered by the search system 110.

The record generation module 510 may generate and update the search records 516 based on data retrieved from a plurality of data sources (not illustrated). For example, the record generation module 510 may create new search records and update existing search records based on data retrieved from the data sources. The data sources may include a variety of different data providers and the types of data retrieved from the data sources can include a variety of different types of data related to application/web states. The data sources may include data from application developers, such as application developers' websites and data feeds provided by developers. The data sources may include operators of digital distribution platforms 104 configured to distribute native applications to user devices 520. The data sources may also include other websites, such as websites that include web logs (i.e., blogs), application review websites, or other websites including data related to applications. Additionally, the data sources may include social networking sites, such as "FACEBOOK®" by Facebook, Inc. (e.g., Facebook posts) and "TWITTER®" by Twitter Inc. (e.g., text from tweets). Data sources may also include online databases that include, but are not limited to, data related to movies, television programs, music, and restaurants. Data sources may also include additional types of data sources in addition to the data sources described above. Different data sources may have their own content and update rate.

In some examples, some data included in the search data store 512 may be manually generated by a human operator. For example, some data included in the search records 516 (e.g., search record information 1202) may be manually generated by a human operator. The record generation module 510 (or a human operator) may update the data included in the search records 516 over time so that the search system 110 provides up-to-date results.

FIGS. 12A-12B illustrate example search records 516. The search record 516-1 of FIG. 12A is different than the search record 516-2 of FIG. 12B in that the search record 516-2 of FIG. 12B includes access mechanism templates and rules for generating access mechanisms, whereas the search record 516-1 of FIG. 12A includes static access mechanisms. The search record 516-1 of FIG. 12A may be referred to as a static search record and the search record 516-2 of FIG. 12B may be referred to as a dynamic search record. The search data store 512 may include a plurality of static search records and/or dynamic search records having a similar structure as the search records 516-1, 516-2. The search records 516-1, 516-2 may be generically referred to herein as search records 516.

A search record 516 may include a search record identifier 1200 (hereinafter "record ID 1200"). The record ID 1200 may be used to identify the search record 516 among the other search records included in the search data store 512. The record ID 1200 may be a string of alphabetic, numeric, and/or symbolic characters (e.g., punctuation marks) that uniquely identify the search record 516 in which the record ID 1200 is included. In some examples, the record ID 1200 may include text/numbers that identify an application and/or application state associated with the search record 516 (e.g., an application name/ID and/or a URL associated with the application state).

The search record 516 includes link data 1116 that the search system 110 may use to generate the search results 522. The link data 1116 may include data for rendering the user selectable links 1118, such as text and/or image data to be included in the user selectable link 1118. For example, the link data 1116 may include text and/or image data for rendering a user selectable link that is descriptive of the state described by the search record information 1202 (e.g., the state specified by the access mechanisms 1106).

The search record 516 includes one or more access mechanisms 1106. The access mechanism(s) 1106 may include one or more application access mechanisms, one or more web access mechanisms, and one or more application download mechanisms. The user device 520 may use the one or more application access mechanisms and the one or more web access mechanisms to access the same, or similar, state/functionality of the native/web application referenced in the search record information 1202. For example, the user device 520 may use the different access mechanism(s) 1106 to retrieve similar information, play the same song, or play the same movie. The application download mechanisms may indicate sites (e.g., web/native, such as the GOOGLE PLAY® digital distribution platform) where the native applications referenced in the application access mechanisms 1106 can be downloaded.

The search module 514 may identify the search records 516 and score/filter the search records 516 based on data included in the search record information 1202. The search record information 1202 may include data that describes an application state into which an application is set according to the access mechanism(s) 1106 in the search record 516. The search record information 1202 may include a variety of different types of data. For example, the search record information 1202 may include structured, semi-structured, and/or unstructured data. In some implementations, the record generation module 510 may extract and/or infer the search record information 1202 from documents retrieved from the data sources (not illustrated). Additionally, or alternatively, the search record information 1202 may be manually generated data. The record generation module 510 may update the search record information 1202 so that up-to-date search results can be provided by the search module 514.

In some examples, the search record information 1202 may include data that may be presented to the user by an application when the application is set into the application state specified by the access mechanism(s) 1106. For example, if one of the access mechanism(s) 1106 is an application access mechanism, the search record information 1202 may include data that describes a state of the native application after the user device 520 has performed the one or more operations indicated in the application access mechanism. In one example, if the search record 516 is associated with a shopping application, the search record information 1202 may include data that describes products (e.g., names and prices) that are shown when the shopping application is set to the application state defined by the access mechanism(s) 1106. As another example, if the search record 516 is associated with a music player application, the search record information 1202 may include data that describes a song (e.g., name and artist) that is played when the music player application is set into the application state defined by the access mechanism(s) 1106.

The types of data included in the search record information 1202 may depend on the type of information associated with the application state specified by the access mechanism(s) 1106. In one example, if the search record 516 is for an application that provides reviews of restaurants, the search record information 1202 may include information (e.g., text and numbers) related to a restaurant, such as a category of the restaurant, reviews of the restaurant, and a menu for the restaurant. In this example, the access mechanism(s) 1106 may cause the application (e.g., a web or native application) to launch and retrieve information for the restaurant (e.g., using the web browser application 1102 or one of native applications 1120). As another example, if the search record 516 is for an application that plays music, the search record information 1202 may include information related to a song, such as the name of the song, the artist, lyrics, and listener reviews. In this example, the access mechanism(s) 1106 may cause the application to launch and play the song described in the search record information 1202.

In some examples, the search record information 1202 may include an application name/ID that indicates the application associated with the search record 516. In some implementations, the UF determination system 108 may use the application name/ID to identify the application associated with the search record 516. In some cases, the access mechanisms 1106 may indicate the application associated with the search record 516. For example, if the access mechanism 1106 includes a domain name and path, the domain/path may indicate the application associated with the search record 516. In some implementations, the UF determination system 108 may determine the application associated with the search record 516 based on the domain/path included in the access mechanisms.

In some implementations, the search record information 1202 may include entity names associated with the application state. An entity may refer to a person, place, or thing. For example, an entity may refer to a business, a product, a service, a piece of media content, a political organization/figure, a public figure, or a destination. In some implementations, the search system 110 (e.g., the query analysis module 1300) can identify entities (e.g., entity names) in the search query 1104 and then generate search results 522 based on the identified entities. In implementations where the search system 110 identifies entities, the search system 110 may include an entity data store (not illustrated) that stores entity records defining the entities. The entity records may include an entity name (e.g., a business name), an entity type that indicates the category of the entity (e.g., a restaurant business), and entity information describing the entity (e.g., a restaurant address, phone number, and open hours). In response to receiving a search query 1104, the query analysis module 1300 may identify the entities (e.g., entity names) included in the search query 1104 based on matches between terms in the search query 1104 and terms in the entity records (e.g., the entity name, entity type, and entity information). The set generation module 1302 may identify search records 516 based on the identified entities. For example, the set generation module 1302 may match entities in the search queries 1104 to entities included in the search record information 1202 (e.g., entities associated with the state of the search record 516). The set generation module 1302 may select search records 516 having matching entities for the consideration set. The set processing module 1304 may then score the search records 516 based on matches between entities in the search query 1104 and the search records 516, along with other scoring features.

The search record 516 may include a function name 1204 associated with the application/web state accessed by the access mechanisms 1106 included in the search record 516. The function name 1204 may correspond to the function names that are mapped by the function mapping module 504. The record generation module 510 may communicate with the function mapping module 504 in order to generate the function name 1204 in the search record 516. For example, the record generation module 510 may request a function name 1204 for the search record 516 from the function mapping module 504. The request may include one or more access mechanisms 1106 that the function mapping module 504 may use to identify a function name in the function data store 528. The function mapping module 504 may return the function name associated with the received access mechanisms 1106 to the record generation module 510. The record generation module 510 may then assign the function name 1204 to the search record 516.

In some cases, the search record 516 may include function metadata 1206 associated with the function name 1204. In order to generate the function metadata 1206, the record generation module 510 may request the function metadata from the function mapping module 504 using the function name 1204. The function mapping module 504 may return the function metadata 1206 (e.g., from a function mapping record 526) associated with the function name 1204 to the record generation module 510. The record generation module 510 generates the function metadata 1206 in the search record 516 based on the function metadata returned from the function mapping module 504. The function metadata 1206 may be used during search (e.g., for identification and/or scoring of search records 516). In some implementations, the record generation module 510 may implement conditions for assigning function metadata to the search records 516. For example, the record generation module 510 may determine whether to assign function metadata to the search records 516 based on the usage fraction values associated with the function names. In one example, the record generation module 510 may be configured to assign function metadata for function names that have greater than a threshold usage fraction value. In this example, if the usage fraction value for a function name is less than the threshold usage fraction value, the record generation module 510 may not assign the function metadata for that function to the search record.

The search record 516 may include one or more usage fraction values 1208 and one or more user engagement values 1210. The record generation module 510 may retrieve the usage fraction values and the user engagement values from the UF analysis system 108 (e.g., the analytics data store 502). For example, the record generation module 510 may request the usage fraction values and/or the user engagement values from the UF analysis system 108, which may then provide the requested values.

As described herein with respect to the analytics records 524, the usage fraction values and the user engagement values are associated with function names of applications. As such, the record generation module 510 may retrieve the usage fraction values and the user engagement values from the analytics data store 502 based on the application and function name associated with the search record 516. In some cases, the record generation module 510 may determine the application associated with the search record 516 based on an application name included in the record ID 1200 and/or the record information 1202. In other cases, the record generation module 510 may determine the application associated with the search record 516 based on the domain name and path included in the access mechanisms 1106 of the search record 516. If the search record 516 includes a function name 1204, the record generation module 510 may retrieve the usage fraction values and/or the user engagement values based on the application name and the function name 1204 included in the search record 516. If the search record 516 does not include the function name 1204, the record generation module 510 may request the function name from the UF analysis system 108. For example, the record generation module 510 may request the function name from the function mapping module 504. In a specific example, the record generation module 510 may request that the function mapping module 504 map a function name to the access mechanism of the search record 516. The record generation module 510 may then retrieve the usage fraction values and/or the user engagement values based on the function name indicated by the function mapping module 504.

With respect to FIGS. 12A and 12B, search records 516-1, 516-2 include static access mechanisms 1106 and access mechanism templates/rules 1212, respectively. The static access mechanisms 1106 included in the search record 516-1 of FIG. 12A may already have been defined prior to receipt of a search query. If a search record 516-1 including a static access mechanism 1106 is selected during the search, the search module 514 may retrieve the static access mechanism 1106 from the search record 516-1 and transmit the static access mechanism 1106 in the search results 522.

An access mechanism may be generated (e.g., by the set processing module 1304) from the access mechanism template/rules 1212 after receipt of the query wrapper 518 based on a variety of different factors (e.g., terms of the search query 1104, geolocation of the user 1108, entities included in the search query 1104, or other parameters). The access mechanism template may include a partially completed access mechanism (e.g., a domain and a partial path). Part of the access mechanism template may include parameters for completion according to the template rules. For example, the template may include a portion for inclusion of the search query 1104 received by the search module 514. In this example, the template rules may cause the set processing module 1304 to insert the user's search query into the template to generate a complete access mechanism including the search query 1104 (or a processed version of the search query 1104). Such a completed access mechanism may launch an application state that performs a search for the application using the received search query 1104. In another example, an access mechanism template may have a portion for inserting a geolocation of the user. In a specific example, an access mechanism template for a taxi requesting application may include a portion for insertion of the user's geo-location. Such a completed access mechanism may launch the taxi application into a state that hails a taxi at the user's geolocation.

Referring to FIG. 5, the search module 514 can use the search query 1104 and the additional data included in the query wrapper 518 to generate the search results 522. The search module 514 performs a search for search records 516 included in the search data store 512 in response to the received query wrapper 518. In some implementations, the search module 514 generates result scores 1114 for search records 516 identified during the search. The result score 1114 associated with a search record 516 may indicate the relevance of the search record 516 to the search query 1104. A larger result score may indicate that the search record 516 is more relevant to the search query 1104. As described herein, the search module 514 may retrieve/generate access mechanisms 1106 from the scored search records 516. The search module 514 can transmit a result score 1114 along with an access mechanism 1106 retrieved from a scored search record 516 in order to indicate the rank of the access mechanism among other transmitted access mechanisms.

FIG. 13 illustrates an example search module 514 that includes a query analysis module 1300, a consideration set generation module 1302 (hereinafter "set generation module 1302"), and a consideration set processing module 1304 (hereinafter "set processing module 1304").

The query analysis module 1300 receives the query wrapper 518. The query analysis module 1300 analyzes the received search query 1104. For example, the query analysis module 1300 may perform various analysis operations on the received search query 1104, such as tokenization of the search query 1104, filtering of the search query 1104, stemming, synonymization, and stop word removal. In some implementations, the query analysis module 1300 may identify entities included in the search query.

The set generation module 1302 identifies a plurality of search records 516 based on the output of the query analysis module 1300 (e.g., tokens, entities, synonyms, etc.). For example, the set generation module 1302 may identify a plurality of search records 516 based on matches between terms of the search query 1104 and terms in the search records 516. For example, the set generation module 1302 may identify the search records 516 based on matches between tokens generated by the query analysis module 1300 and words included in the search records 516, such as words included in the record information search record information 1202. Additionally, or alternatively, the set generation module 1302 may identify the search records 516 based on matches between tokens generated by the query analysis module 1300 and words included in the function name 1204 and/or the function metadata 1206. In some implementations, the set generation module 1302 may generate a preliminary score for the search records in the consideration set (e.g., based on the matches described above). In these implementations, the set generation module may weight the preliminary score based on one or more usage fraction values associated with the function name/metadata associated with a match. For example, a preliminary score for a search record may be boosted more for larger usage fraction values.

The set processing module 1304 may score the search records in the consideration set in order to generate a set of search results 522. The scores associated with the search records 516 may be referred to as "result scores." The set processing module 1304 may determine a result score for each of the search records in the consideration set. The result scores associated with a search record may indicate the relative rank of the search record (e.g., the access mechanisms) among other search records. When ordering search results 522 (e.g., at the set processing module 1304 and/or the user device 520), the search results 522 may be ordered from the highest result score to the lowest result score from the top of the display to the bottom.

The set processing module 1304 may generate result scores 1114 for search records 516 in a variety of different ways. For example, as described herein, the set processing module 1304 may generate result scores 1114 for search records 516 based on usage fraction values 1208 and/or user engagement values 1210 associated with the search records 516.

In some implementations, the set processing module 1304 generates a result score 1114 for a search record 516 based on one or more scoring features. The scoring features may be associated with the search record 516 and/or the search query 1104. A search record scoring feature (hereinafter "record scoring feature") may be based on any data associated with a search record 516. For example, record scoring features may be based on any data included in the search record information 1202, the usage fraction values 1208, the user engagement values 1210, the function name 1204, and the function metadata 1206.

In one example, a record scoring feature may be a usage fraction value 1208 associated with the search record 516. In another example, a record scoring feature may be based on the usage fraction value 1208 and the user engagement value 1210. For example, the record scoring feature may be the product of the usage fraction value 1208 and the user engagement value 1210 (referred to herein as a "normalized usage fraction value"). In a more specific example, if the usage fraction value (e.g., time or event based usage fraction value) is 25% and the user engagement value (e.g., total monthly active users) is 20000, then the normalized usage fraction value may equal 5000.

In some cases, a search record 516 may have a single usage fraction value 1208 that is used as a record scoring feature. In other cases, a search record 516 may have multiple types of usage fraction values 1208, each of which can be used as a record scoring feature. For example, a search record 516 may include a time-based usage fraction value and an event-based usage fraction value that are both used as record scoring features. In still other cases, a search record 516 may include multiple time-based usage fraction values and/or multiple event-based usage fraction values that are used as record scoring features. In still other cases, a search record 516 may include record scoring features that are based on multiple usage fraction values (e.g., a ratio of a first usage fraction value to a second usage fraction value). Although a search record 516 may include various record scoring features (e.g., calculated before search time), some of the record scoring features described herein can be calculated by the set processing module 1304 at search time (e.g., the normalized usage fraction value) rather than being stored before search time.

In some cases, the search record 516 may include a record scoring feature (e.g., in the search record information 1202) that indicates whether the function name 1204 associated with the search record 516 is a dominant function of the application (e.g., whether the application specializes in the function). For example, the record scoring feature may be a binary feature (e.g., 1 if dominant, 0 if not dominant). A dominant function may refer to a function of an application that has a threshold level of usage and/or is used a threshold amount more than other functions of the application. The record generation module 510 may determine whether a function is a dominant function of the application in a variety of different ways and indicate in the search record 516 whether the search record is associated with a dominant function. In one case, the record generation module 510 can indicate the search record 516 is associated with a dominant function if the function name is associated with a usage fraction value that is greater than a threshold value (e.g., greater than 50%). In another case, the record generation module 510 can indicate the search record 516 is associated with a dominant function if a usage fraction value associated with the function is substantially greater than other functions (e.g., a threshold amount greater than the next popular function). For example, a function may be a dominant function if a usage fraction value associated with the function is 50% greater than the next highest usage fraction value for the application. The threshold values for defining a dominant function can be set by the search system operator.

The set processing module 1304 may use record scoring features in addition to the record scoring features described above. Example additional record scoring features may be based on metrics associated with an entity of the search record 516, such as a person, place, or thing described in the search record 516. Example metrics may include the popularity of a place described in the search record 516 and/or ratings (e.g., user ratings) of the place described in the search record 516. In one example, if the search record 516 describes a song, a metric may be based on the popularity of the song described in the search record 516 and/or ratings (e.g., user ratings) of the song described in the search record 516. The record scoring features may also be based on measurements associated with the search record 516, such as how often the search record 516 is retrieved during a search and how often access mechanisms 1106 of the search record 516 are selected by a user. Additional or alternative record scoring features may also be implemented.

The usage fraction values described herein may assist the set processing module 1304 (e.g., a scoring model) in producing relevant results because the values may provide a quantitative understanding of the importance of various application functions. For example, a usage fraction value may indicate the importance of a function (e.g., how often the function is accessed and/or for how long the function is accessed). The usage fraction values may also indicate to the set processing module 1304 whether an application specializes in a function (e.g., whether the application has a dominant function). Additionally, if the usage fraction values are combined with user engagement values (e.g., as a normalized usage fraction value), the set processing module 1304 (e.g., a scoring model) can take into account the popularity of various functions across different applications.

A query scoring feature may include any data associated with the search query 1104. For example, query scoring features may include, but are not limited to, a number of words in the search query 1104, the popularity of the search query 1104, and the expected frequency of the words in the search query 1104. A record-query scoring feature may include any data generated based on data associated with both the search record 516 and the search query 1104 that resulted in identification of the search record 516 by the set generation module 1302. For example, record-query scoring features may include, but are not limited to, parameters that indicate how well the terms of the search query 1104 match the terms of the search record information 1202, the function name 1204, and/or the function metadata 1206 of the identified search record (e.g., the feature may be a number indicating the number of matches). In some implementations, the set processing module 1304 may modify the record-query feature based on the usage fraction value associated with the feature. For example, if a query term is matched in the function name/metadata, the score for the match may be modified based on the usage fraction value associated with the matched function name/metadata. In a more specific example, if the record-query scoring feature is 1 for a match, then the feature may be weighted by (e.g., multiplied by) the usage fraction value associated with the match. The set processing module 1304 may generate a result score 1114 for a search record 516 based on at least one of the record scoring features, the query scoring features, and the record-query scoring features.

The set processing module 1304 may determine a result score 1114 based on one or more of the scoring features listed herein and/or additional scoring features not explicitly listed. In some examples, the set processing module 1304 may include one or more machine learned models (e.g., a supervised learning model) configured to receive one or more scoring features. The one or more machine learned models may generate result scores 1114 based on at least one of the record scoring features, the query scoring features, and the record-query scoring features. For example, the set processing module 1304 may pair the search query 1104 with each search record and calculate a vector of features for each (query, record) pair. The vector of features may include one or more record scoring features, one or more query scoring features, and one or more record-query scoring features. The set processing module 1304 may then input the vector of features into a machine-learned regression model to calculate a result score 1114 for the search record. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

A specific example of how the different scoring features described herein may provide different insights into the relevancy of search records 516 is now described. In this example, it can be assumed that three search records are identified by the set generation module 1302 based on a received search query (e.g., a query indicating a user's intention to book a flight). A first search record is for a travel application called TravelApp1. The search record for TravelApp1 has a user engagement value of 1,000,000 users, a function name "book flight," and a usage fraction value of 95%. A second search record is for a travel application called TravelApp2. The search record for TravelApp2 has a user engagement value of 2,000,000 users, a function name "book flight," and a usage fraction value of 1%. A third search record is for a flight booking application called FlightApp. The search record for FlightApp has a user engagement value of 100,000 users, a function name "book flight," and a usage fraction value of 99%. If a user intends to book flights, from the perspective of user engagement values alone, the search record for TravelApp2 may appear to be the most relevant because it has the largest user engagement value. From the perspective of usage fraction values alone, it may appear that FlightApp (with 99%) has the most specialized function. From the perspective of the normalized usage fraction value, it may appear that TravelApp1 is the most relevant because it is associated with the largest normalized usage fraction value of (0.95×1,000,000). Accordingly, as illustrated by the example above, the user engagement values, usage fraction values, and normalized usage fraction values each provide the set processing module 1304 with signals that may be used to quantify the relevance of search records to a user's intent (e.g., as indicated by the search query). Moreover, the normalized usage fraction value may allow the set processing module 1304 to assess the relevance of a function (e.g., book flight) over a plurality of different applications.

FIG. 14 illustrates an example method for performing a search according to the present disclosure. The method is described with reference to the search module 514 of FIG. 13. In block 1400, the query analysis module 1300 receives a query wrapper 518 from a user device 518 and analyzes the search query 1104. In block 1402, the set generation module 1302 identifies a consideration set of search records based on the query wrapper 518 and the set processing module 1304 scores the search records of the consideration set. Put another way, the set processing module 1304 may generate result scores 1114 for the search records of the consideration set. For example, the set processing module may generate result scores 1114 for the search records using one or more types of usage fraction values, one or more user engagement values, function metadata, and other scoring features. In block 1404, the set processing module 1304 generates search results 522 based on the scored search records. The search results 522 may include access mechanisms 1106 and link data 1116 from the scored search records, along with result scores 1114 corresponding to the search records. In block 1406, the set processing module 1304 transmits search results 522 to the user device 520.

Although the function names described herein may be human readable function names that indicate the functionality provided by different application (e.g., application states), in some implementations, function names may include, or be replaced by, identifiers that may not be human readable. Such identifiers may be used in place of the function names. For example, event analytics data, function analytics data, usage fraction values, and user engagement values may be calculated based on the unique identifiers in a similar manner described above. Furthermore, the search system 110 of the present disclosure may receive a query wrapper and generate search results in a similar manner described above when such identifiers are used.

Modules and data stores included in the systems (e.g., 108, 110) represent features that may be included in the systems of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components.

For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data (e.g., records) included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems may include one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with the network 112. The one or more computing devices of the systems may also be configured to communicate with one another (e.g., via a computer network). In some examples, the one or more computing devices of the systems may include one or more server computing devices configured to communicate with user devices (e.g., receive query wrappers and transmit search results), gather data from data source, index data, store the data, and store other documents. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A method for improving relevance of search results, the method comprising:
   retrieving, at one or more computing devices, event analytics data for a software application installed on user devices, wherein the software application includes accessible application states that can be accessed by the user devices, and wherein the event analytics data indicates a number of times each of the accessible application states was accessed by the user devices;
   retrieving a list of function names for the software application and mapping instructions indicating how to map the function names to the accessible application states of the software application, wherein each of the function names indicates a functionality associated with the software application, and wherein each of the function names maps to one or more of the accessible application states of the software application;
   mapping the function names to application states accessed by the user devices;
   determining a number of times each of the function names was mapped to the accessible application states accessed by the user devices;
   determining a usage fraction value for each of the function names based on the number of times each of the function names was mapped, the usage fraction value for each function name indicating the number of times the function name was mapped relative to the number of times each of the function names was mapped;
   determining a normalized usage fraction value which is calculated by multiplication of the usage fraction value and a user engagement value, wherein the user engagement value includes a number of users using the software application;
   receiving a search query from a querying user device;
   generating search results based on the received search query and the normalized usage fraction value; and
   transmitting the search results to the querying user device,
   wherein the determining of the normalized usage fraction value improves relevance of one or more of the search results.

2. The method of claim 1, further comprising assigning one of the usage fraction value to search records included in a search data store, wherein generating the search results comprises:
   identifying one of the search records based on the search query;
   scoring the identified search record based on the usage fraction value assigned to the identified search record; and
   generating one of the search results based on the identified search record.

3. The method of claim 2, further comprising, prior to receiving the search query, assigning the function names to a plurality of the search records,
   wherein identifying the search record comprises matching one or more terms of the search query to a function name assigned to the search record.

4. The method of claim 2, further comprising, prior to receiving the search query, assigning function metadata to a plurality of search records, the function metadata including a plurality of terms associated with one of the function names,
   wherein identifying the search record comprises matching one or more terms of the search query to one or more terms of the function metadata assigned to the search record.

5. The method of claim 2, further comprising determining whether the usage fraction value assigned to the identified search record is greater than a threshold value,
   wherein scoring the identified search record comprises scoring the identified search record based on whether the usage fraction value assigned to the identified search record is greater than the threshold value.

6. The method of claim 2, further comprising determining a number of user devices from which the event analytics data was retrieved,
   wherein scoring the identified search record comprises scoring the identified search record based on the number of user devices.

7. The method of claim 6, further comprising scoring the identified search record based on a product of the assigned usage fraction value and the number of user devices from which the event analytics data was retrieved.

8. The method of claim 1,
   wherein the usage fraction value is a first type of usage fraction value, the method further comprising determining a second type of usage fraction value for each of the function names of the software application, the second type of usage fraction value being different than the first type of usage fraction value,
   wherein the second type of usage fraction value is based on the number of times each of the function names was mapped, and
   wherein generating search results comprises generating search results based on at least one usage fraction value of the first type and at least one usage fraction value of the second type.

9. The method of claim 8, wherein the second type of usage fraction value indicates a number of times user devices accessed a sequence of one or more states associated with the function name relative to a total number of times user devices accessed sequences of one or more states associated with the each of the function names.

10. The method of claim 1, wherein the event analytics data indicates an amount of time each of the accessible application states was accessed by the user devices, the method further comprising:

determining a time-based usage fraction value for each of the function names of the software application, the time-based usage fraction value for each function name indicating the amount of time the user devices accessed the application states associated with the function name relative to a total amount of time the user devices accessed the other function names of the software application; and generating the search results based on at least one of the time-based usage fraction value.

11. A system for improving relevance of search results, the system comprising:

one or more memory components configured to store computer-readable instructions; and one or more computing devices in communication with the one or more memory components, the one or more computing devices including one or more processors that execute the computer-readable instructions, wherein the computer readable instructions, when executed by the one or more processors, cause the one or more computing devices to:

retrieve event analytics data for a software application installed on user devices, wherein the software application includes accessible application states that can be accessed by the user devices, and wherein the event analytics data indicates a number of times each of the accessible application states was accessed by the user devices;

retrieve a list of function names for the software application and mapping instructions indicating how to map the function names to the accessible application states of the software application, wherein each of the function names indicates a functionality associated with the software application, and wherein each of the function names maps to one or more of the accessible application states of the software application;

map the function names to application states accessed by the user devices;

determine a number of times each of the function names was mapped to the accessible application states accessed by the user devices;

determine a usage fraction value for each of the function names based on the number of times each of the function names was mapped, the usage fraction value for each function name indicating the number of times the function name was mapped relative to the number of times each of the function names was mapped;

determine a normalized usage fraction value which is calculated by multiplication of the usage fraction value and a user engagement value, wherein the user engagement value includes a number of users using the software application;

receive a search query from a querying user device;

generate search results based on the received search query and the normalized usage fraction value; and transmit the search results to the querying user device, and wherein the determining of the normalized usage fraction value improves relevance of one or more of the search results.

12. The system of claim 11, further comprising a search data store, wherein the one or more computing devices are configured to assign one of the usage fraction value to search records included in the search data store, and wherein the one or more computing devices are further configured to generate the search results by:

identifying one of the search records based on the search query;

scoring the identified search record based on the usage fraction value assigned to the identified search record; and generating one of the search results based on the identified search record.

13. The system of claim 12, wherein, prior to receiving the search query, the one or more computing devices are further configured to assign the function names to a plurality of the search records, and wherein the one or more computing devices are further configured to identify the search record by matching one or more terms of the search query to a function name assigned to the search record.

14. The system of claim 12, wherein, prior to receiving the search query, the one or more computing devices are further configured to assign function metadata to a plurality of search records, the function metadata including a plurality of terms associated with one of the function names, and wherein the one or more computing devices are further configured to identify the search record by matching one or more terms of the search query to one or more terms of the function metadata assigned to the search record.

15. The system of claim 12, wherein the one or more computing devices are further configured to:

determine whether the usage fraction value assigned to the identified search record is greater than a threshold value; and score the identified search record based on whether the usage fraction value assigned to the identified search record is greater than the threshold value.

16. The system of claim 12, wherein the one or more computing devices are further configured to:

determine a number of user devices from which the event analytics data was retrieved; and score the identified search record based on the number of user devices.

17. The system of claim 16, wherein the one or more computing devices are further configured to score the identified search record based on a product of the assigned usage fraction value and the number of user devices from which the event analytics data was retrieved.

18. The system of claim 11, wherein the usage fraction value is a first type of usage fraction value, wherein the one or more computing devices are configured to determine a second type of usage fraction value for each of the function names of the software application, the second type of usage fraction value being different than the first type of usage fraction value, wherein the second type of usage fraction value is based on the number of times each of the function names was mapped, and wherein the one or more computing devices are further configured to generate search results based on at least one usage fraction value of the first type and at least one usage fraction value of the second type.

19. The system of claim 18, wherein the second type of usage fraction value indicates a number of times user devices accessed a sequence of one or more states associated with the function name relative to a total number of times user devices accessed sequences of one or more states associated with the each of the function names.

20. The system of claim 11,
wherein the event analytics data indicates an amount of time each of the accessible application states was accessed by the user devices, and
wherein the one or more computing devices are configured to:
determine a time-based usage fraction value for each of the function names of the software application, the time-based usage fraction value for each function name indicating an amount of time the user devices accessed the application states associated with the function name relative to a total amount of time the user devices accessed the other function names of the software application; and
generate the search results based on at least one of the time-based usage fraction value.

* * * * *